United States Patent
Shigesato et al.

(10) Patent No.: US 9,738,250 B2
(45) Date of Patent: Aug. 22, 2017

(54) SEATBELT RETRACTOR

(71) Applicant: ASHIMORI INDUSTRY CO., LTD., Osaka-shi, Osaka (JP)

(72) Inventors: Kenichi Shigesato, Higashi-Osaka (JP); Insu Choi, Settsu (JP)

(73) Assignee: ASHIMORI INDUSTRY CO., LTD., Osaka (JP)

( * ) Notice: Subject to any disclaimer, the term of this patent is extended or adjusted under 35 U.S.C. 154(b) by 110 days.

(21) Appl. No.: 14/821,238

(22) Filed: Aug. 7, 2015

(65) Prior Publication Data

US 2016/0059824 A1    Mar. 3, 2016

(30) Foreign Application Priority Data

Aug. 27, 2014 (JP) ................................ 2014-172940

(51) Int. Cl.
  *B60R 22/46* (2006.01)
  *B60R 22/405* (2006.01)
(52) U.S. Cl.
  CPC ........ *B60R 22/405* (2013.01); *B60R 22/4633* (2013.01)
(58) Field of Classification Search
  CPC .... B60R 22/46; B60R 22/405; B60R 22/4633
  See application file for complete search history.

(56) References Cited

U.S. PATENT DOCUMENTS

| 8,419,068 B2* | 4/2013 | Nakaoka | B60R 22/36 280/806 |
| 8,827,196 B2* | 9/2014 | Nakaoka | B60R 22/46 242/374 |
| 2011/0049283 A1* | 3/2011 | Nakaoka | B60R 22/46 242/374 |
| 2013/0341452 A1* | 12/2013 | Nakaoka | B60R 22/40 242/382 |

FOREIGN PATENT DOCUMENTS

JP    2009-241863 A    10/2009

* cited by examiner

*Primary Examiner* — Sang Kim
(74) *Attorney, Agent, or Firm* — Oliff PLC

(57) ABSTRACT

A locking mechanism comprising a coupling member comprising an arm portion which is rotatably supported by a housing and adapted to rotate in a predetermined direction in response to the actuation of the pretensioner mechanism, a pressing portion adapted to press the pawl towards an engagement direction with the ratchet gear, and a coupling portion adapted to couple the arm portion and the pressing portion; and a rotating device adapted to hold the arm portion restrict a reverse rotation thereof; in the actuation of the pretensioner mechanism, when the pawl, pressed by the pressing portion and in contact with the ratchet gear rotating in the take-up direction, passes over each of teeth of the ratchet gear, the coupling member is elastically twisted and deformed between the arm portion and the pressing portion to hold the pawl in a state of being urged toward the engagement direction with the ratchet gear.

5 Claims, 27 Drawing Sheets

SEATBELT RETRACTOR

CROSS-REFERENCE TO RELATED APPLICATIONS

The present application claims priority from Japanese Patent Application No. 2014-172940, filed on Aug. 27, 2014, the disclosure of which is herein incorporated by reference in its entirety.

TECHNICAL FIELD

The present invention relates to a seatbelt retractor which removes the slack of webbing in case of an emergency such as vehicle collision or the like.

BACKGROUND

There have conventionally been proposed various seatbelt retractors which remove slack of webbing in case of an emergency such as vehicle collision or the like.

For instance, in the seatbelt retractor as disclosed in Japanese Patent Application Laid-open Publication No. 2009-241863, a pretensioner unit is constituted of a pretensioner mechanism and a forced locking mechanism. In case of vehicle collision, the forced locking mechanism is actuated approximately at the same time as the pretensioner mechanism starts operating, and after a webbing is taken up by the pretensioner mechanism, it locks pull-out of the webbing to prevent a drop in belt load when passengers move towards the front of the vehicle. The forced locking mechanism is arranged inside a base block body constituting the pretensioner mechanism.

The base block body has a concave portion formed therein for accommodating the forced locking mechanism which in turn is constituted of a push block, a rotating lever, a block urging spring for urging the push block in the direction of the rotating lever side, a gear-side arm and an urging spring for urging the gear-side arm in the direction of the rotating lever side. A coupling shaft and a mechanical arm constituting the forced locking mechanism are connected to this gear-side arm from the outer side of a base plate.

When a gas generating member of the pretensioner mechanism is actuated in case of vehicle collision, a piston inside a pipe cylinder moves upwards from its normal condition, causing a pinion gear body to rotate. As a result, teeth of a pinion gear portion come in contact with the push block and force it towards outside. In turn, the push block is further forced by the block urging spring causing the rotating lever to rotate which disengages a lower end portion of the rotating lever from a front end portion of the gear-side arm. With this configuration, the gear-side arm is rotated towards the outside by the urging spring, the mechanical arm rotates via the coupling shaft, causing a pawl which is rotatably supported on a side wall portion of a housing unit to rotate and engage a ratchet gear of a take-up drum unit.

Nevertheless, the seatbelt retractor described in the above-mentioned Japanese Patent Application Laid-open Publication No. 2009-241863 employs the block urging spring for urging the push block in the rotating lever-side direction and the urging spring for urging the gear-side arm in the rotating lever-side direction. The respective springs are configured so as to be held, in normal state before the pretensioner mechanism starts operating, inside the push block in a state allowing for urging force to be generated when the forced locking mechanism is in operation. Thus, the push block is required to have the strength to hold this urging force. This makes it difficult to achieve a compact design and a lightweight device, etc.

SUMMARY

The present invention has been made in view of the above circumstances and has as an object to overcome the above problems and to provide a seatbelt retractor which is capable of allowing a more compact design and lightweight.

To achieve the purpose of the invention, there is provided a seatbelt retractor comprising: a housing having a first side wall portion and a second side wall portion facing each other; a take-up drum supported rotatably by and between the first side wall portion and the second side wall portion, and adapted to take up a webbing thereon; a ratchet gear provided at one end of the take-up drum; a pawl rotatably supported at the first side wall portion and which does not engage with the ratchet gear in normal state but engages therewith in response to a predetermined acceleration of a vehicle or a predetermined pull-out acceleration of the webbing to prevent rotation of the take-up drum in a pull-out direction of the webbing; a pretensioner mechanism mounted on the second side wall portion and actuated in case of vehicle collision to cause the take-up drum to rotate in a take-up direction of the webbing; a locking mechanism adapted to hold the pawl in a state of engaging with the ratchet gear by actuation of the pretensioner mechanism; wherein the locking mechanism comprising: a coupling member comprising an arm portion which is rotatably supported by the housing and adapted to rotate in a predetermined direction in response to the actuation of the pretensioner mechanism, a pressing portion adapted to press the pawl towards an engagement direction with the ratchet gear in response to rotation of the arm portion, and a coupling portion adapted to couple the arm portion and the pressing portion; and a rotating device adapted to rotate the arm portion in the predetermined direction in response to the actuation of the pretensioner mechanism and hold the arm portion restrict a reverse rotation thereof; wherein the seatbelt retractor is characterized in that, in the actuation of the pretensioner mechanism, when the pawl, pressed by the pressing portion and in contact with the ratchet gear rotating in the take-up direction, passes over each of teeth of the ratchet gear, the coupling member is elastically twisted and deformed between the arm portion and the pressing portion to hold the pawl in a state of being urged toward the engagement direction with the ratchet gear.

In such the seatbelt retractor, the locking mechanism which is held in the state of engagement of the pawl with the ratchet gear in response to the actuation of the pretensioner mechanism comprises: the coupling member comprising the arm portion which is rotatably supported by the housing and adapted to rotate in a predetermined direction in response to the actuation of the pretensioner mechanism, the pressing portion adapted to press the pawl towards the engagement direction with the ratchet gear in response to rotation of the arm portion, and the coupling portion adapted to couple the arm portion and the pressing portion; and the rotating device adapted to rotate the arm portion in the predetermined direction in response to the actuation of the pretensioner mechanism as well as, after rotation, restrict rotation thereof in a reverse direction; in response to the actuation of the pretensioner mechanism, when the pawl, pressed by the pressing portion and in contact with the ratchet gear rotating in the take-up direction, passes over each of teeth of the ratchet gear, the coupling member is elastically twisted and damned between the arm portion and the pressing portion to hold the pawl in a state of being urged toward the engagement direction with the ratchet gear.

Thus, taking up the webbing on the take-up drum is carried out smoothly by the pretensioner mechanism and once the actuation of the pretensioner mechanism ends, the pawl is caused to engage the ratchet gear immediately which can hinder rotation of the take-up drum in a pull-out direction of the webbing. Accordingly, as it is not necessary to hold the urging member in a state of urging force to be generated in normal state as per conventional art, the strength requirements required for the locking mechanism can be dropped. As a result, it is possible to achieve the compact design and lightweight of the locking mechanism, which in turn makes it possible to realize the seatbelt retractor with the more compact and lightweight configuration than the conventional art.

DETAILED DESCRIPTION

Hereinafter, an embodiment of a seatbelt retractor according to the present invention will be described in detail while referring to the accompanying drawings.

Figure 1:
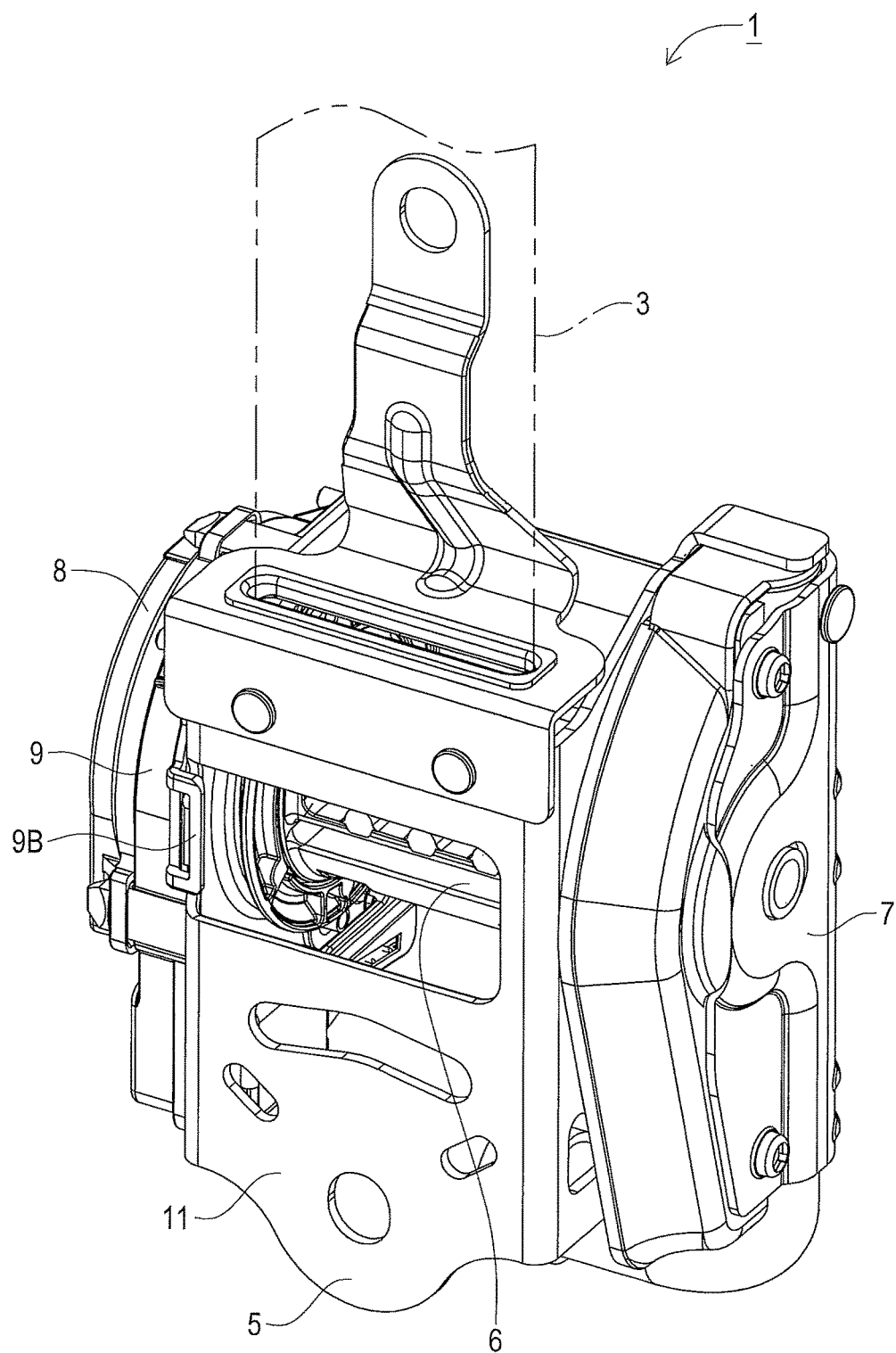
FIG. 1 is a perspective view showing an external appearance of a seatbelt retractor according to an embodiment.
Figure 2:
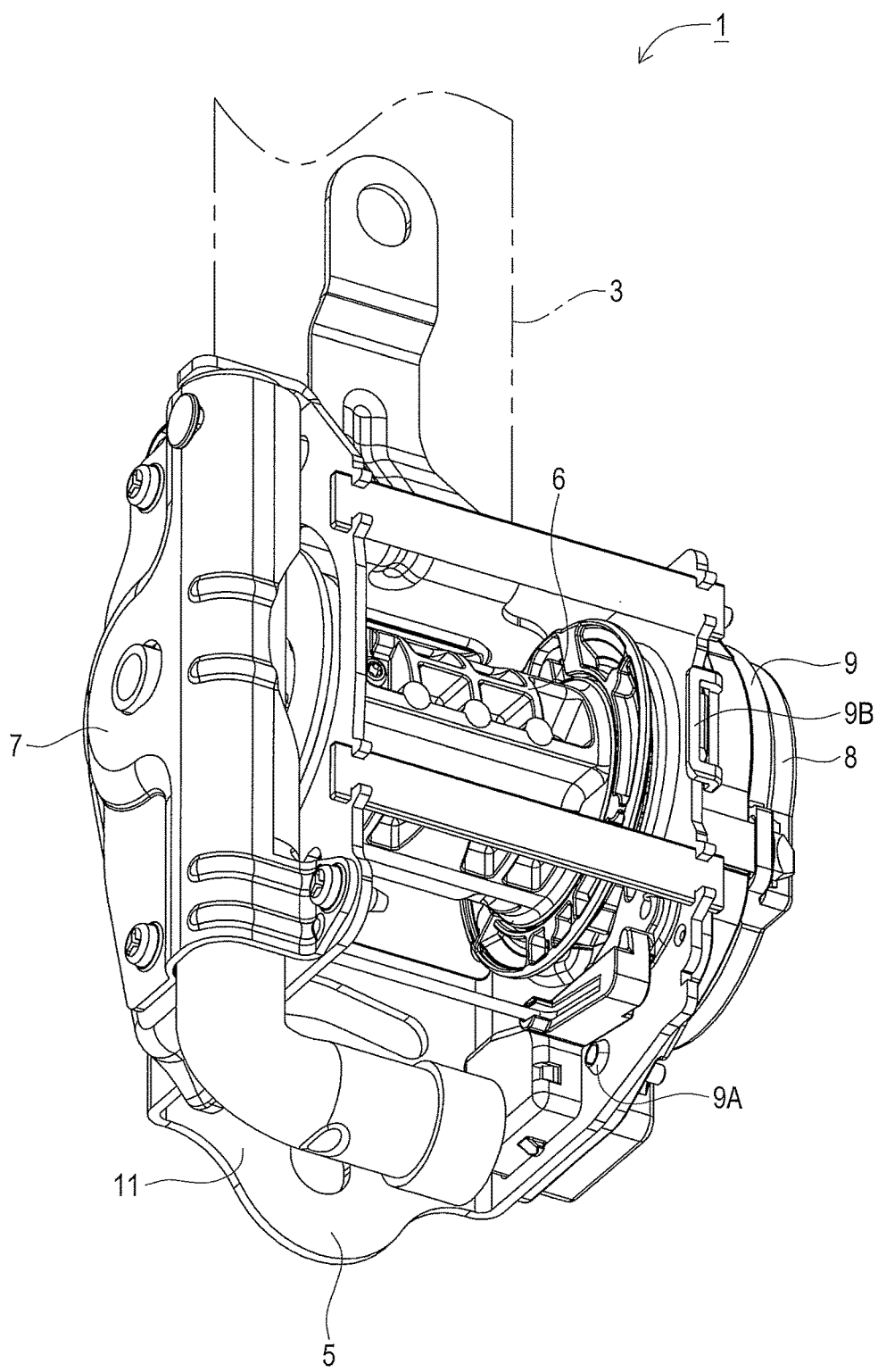
FIG. 2 is a downward perspective view of the seatbelt retractor as seen from the pretensioner unit side.
Figure 3:
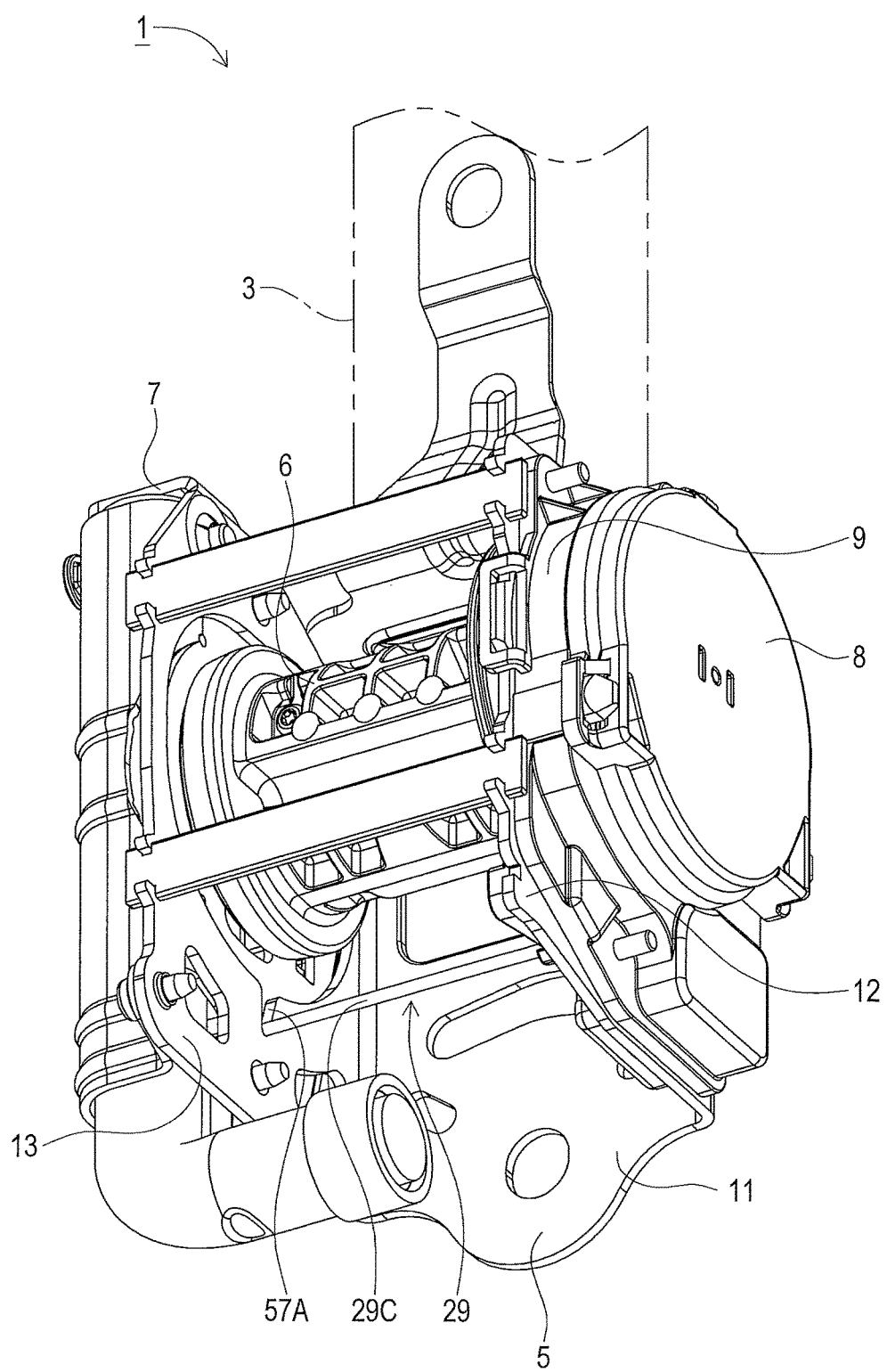
FIG. 3 is a downward perspective view of the seatbelt retractor as seen from the locking unit side.
Figure 4:
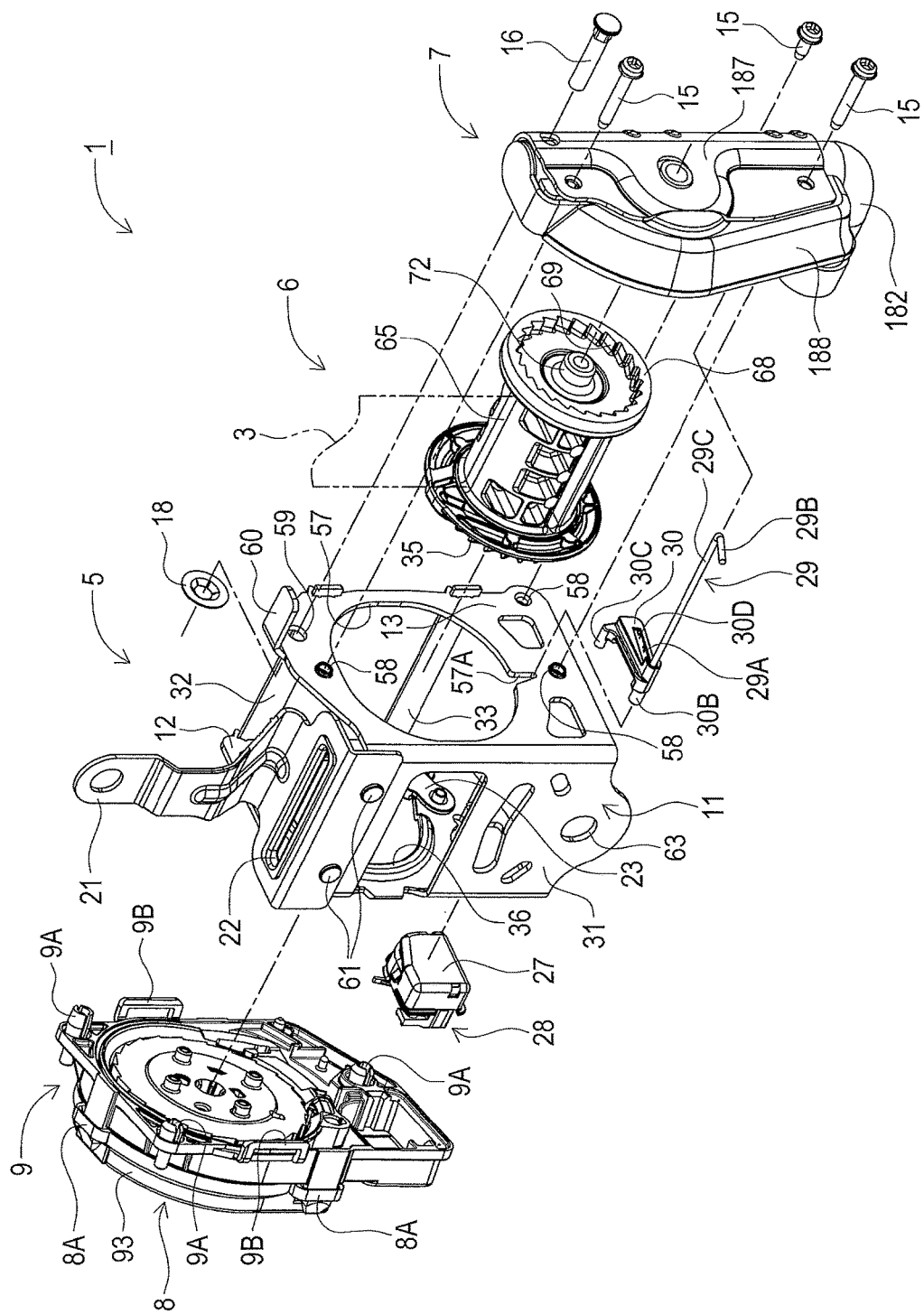
FIG. 4 is a perspective view showing respective assemblies of the seatbelt retractor in a disassembled state.
Figure 5:
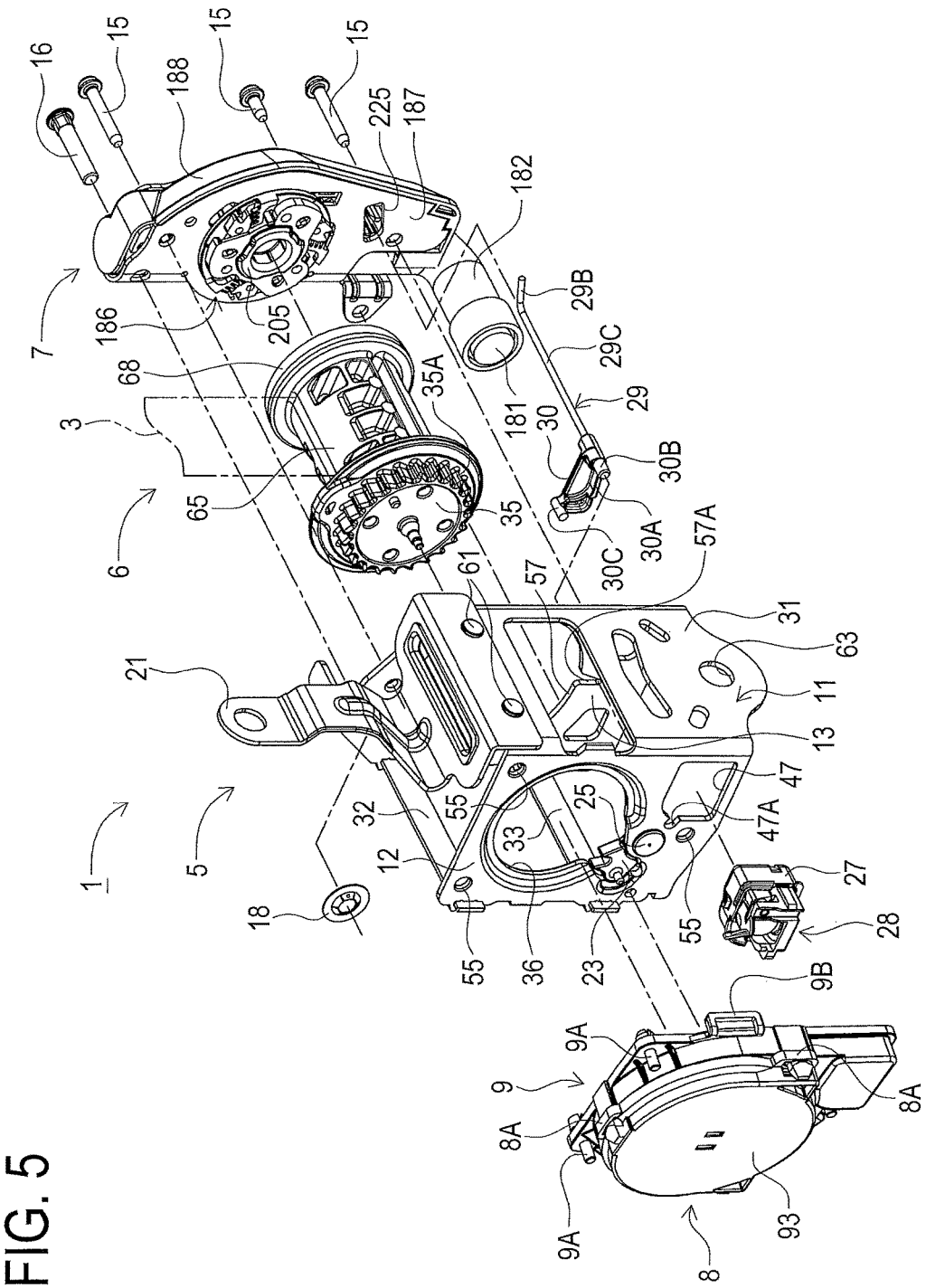
FIG. 5 is a perspective view showing respective assemblies of the seatbelt retractor in a disassembled state.

First, a schematic configuration of the seatbelt retractor 1 according to the embodiment will be described based on FIG. 1 through FIG. 5. FIG. 1 is a perspective view showing an external appearance of a seatbelt retractor 1 according to the embodiment. FIG. 2 is a downward perspective view of the seatbelt retractor as seen from the pretensioner unit side. FIG. 3 is a downward perspective view of the seatbelt retractor as seen from the locking unit side. FIG. 4 and FIG. 5 each are a perspective view showing the respective assemblies of the seatbelt retractor 1 in a disassembled state.

As illustrated in FIG. 1 through FIG. 5, the seatbelt retractor 1 is a device for retracting vehicle webbing 3. The seatbelt retractor 1 has a housing unit 5, a take-up drum unit 6, a pretensioner unit 7, a take-up spring unit 8 and a locking unit 9.

The locking unit 9 has a mechanism cover 97 (refer to FIG. 10) with nylon latches 9A and locking hooks 9B integrally formed therewith. The locking unit 9 is fixed by the nylon latches 9A and the locking hooks 9B to one side wall portion 12 of a housing 11 constituting the housing unit 5. The locking unit 9 constitutes a lock mechanism 10 (refer to FIG. 13) that stops pull-out of a webbing 3 in response to a sudden pull-out of the webbing 3 or an abrupt change in acceleration of a vehicle. A take-up spring unit 8 is fixed to the outside of the locking unit 9 in a direction of a rotational axis of the take-up drum unit 6 by locking hooks 8A which are integrally formed with a spring case 93.

The pretensioner unit 7 is mounted to a side wall portion 13 (a second side wall) of the housing 11. The side wall portion 13 is located opposite to the side wall portion 12 (a first side wall) of the housing 11 having a substantially square-bracket shape in planar view, and screwed by screws 15 inserted through from the outside, in a direction of the rotational axis of the take-up drum unit 6, of the pretensioner unit 7. The pretensioner unit 7 is pinned with a stopper pin 16 and a push nut 18. The stopper pin 16 is inserted into the side wall portion 13 from the outside of the pretensioner unit 7 in the direction of the rotational axis of the take-up drum unit 6. The push nut 18 is inserted to the stopper pin 16 from inside in a direction of the rotational axis of the take-up drum unit 6 with regard to the side wall portion 13.

The take-up drum unit 6 onto which the webbing 3 is wound is rotatably supported between the locking unit 9 which is fixed to the side wall portion 12 of the housing unit 5 and the pretensioner unit 7 which is fixed to the side wall portion 13 of the housing unit 5. The take-up drum unit 6 is constantly urged in a take-up direction of the webbing 3 by the take-up spring unit 8 fixed on the outside of the locking unit 9.

[Schematic Configuration of Housing Unit]

A schematic configuration of the housing unit 5 will next be described referring to FIG. 4 through FIG. 7.

Figure 6:
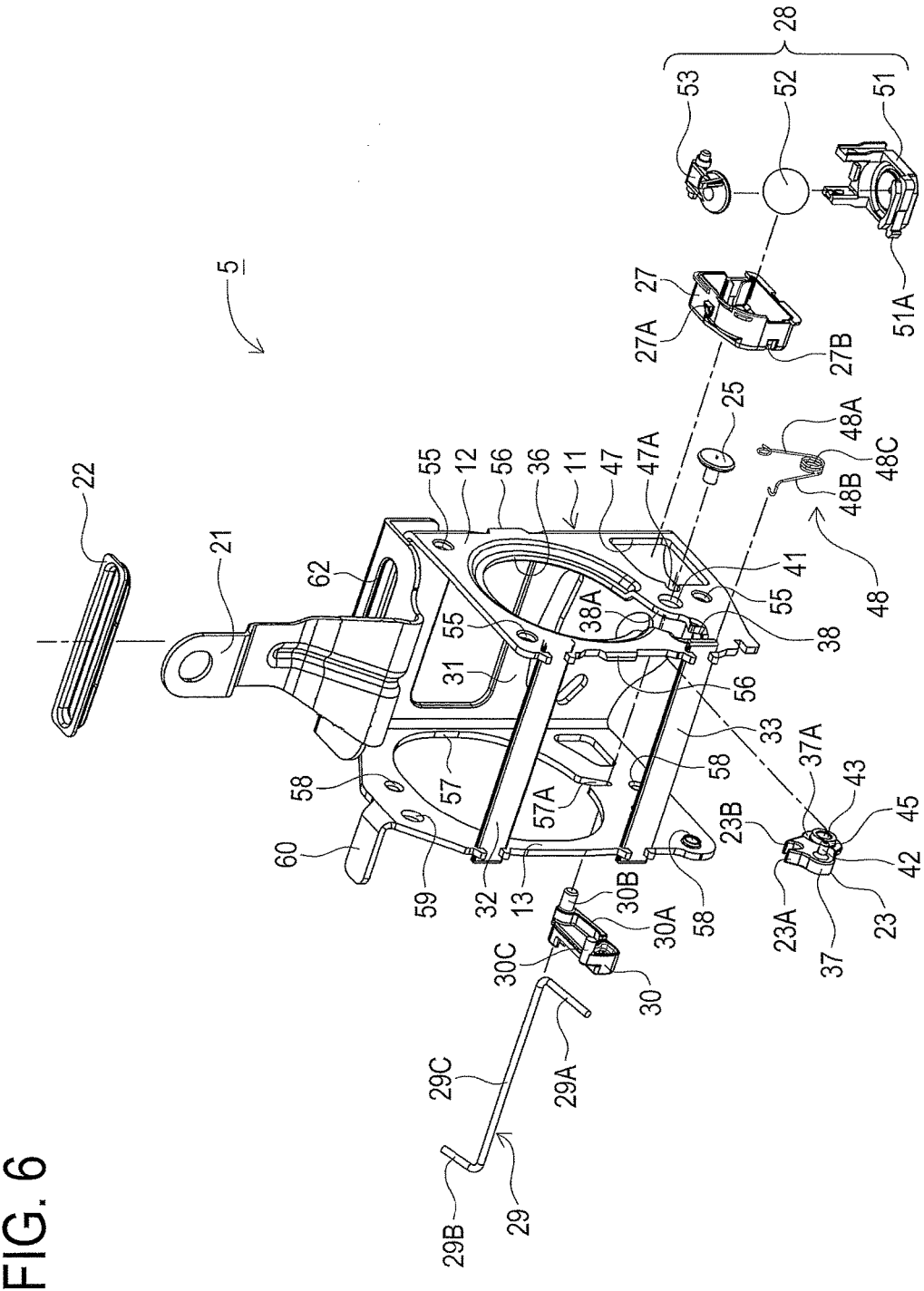
FIG. 6 is an exploded perspective view of a housing unit.
Figure 7:
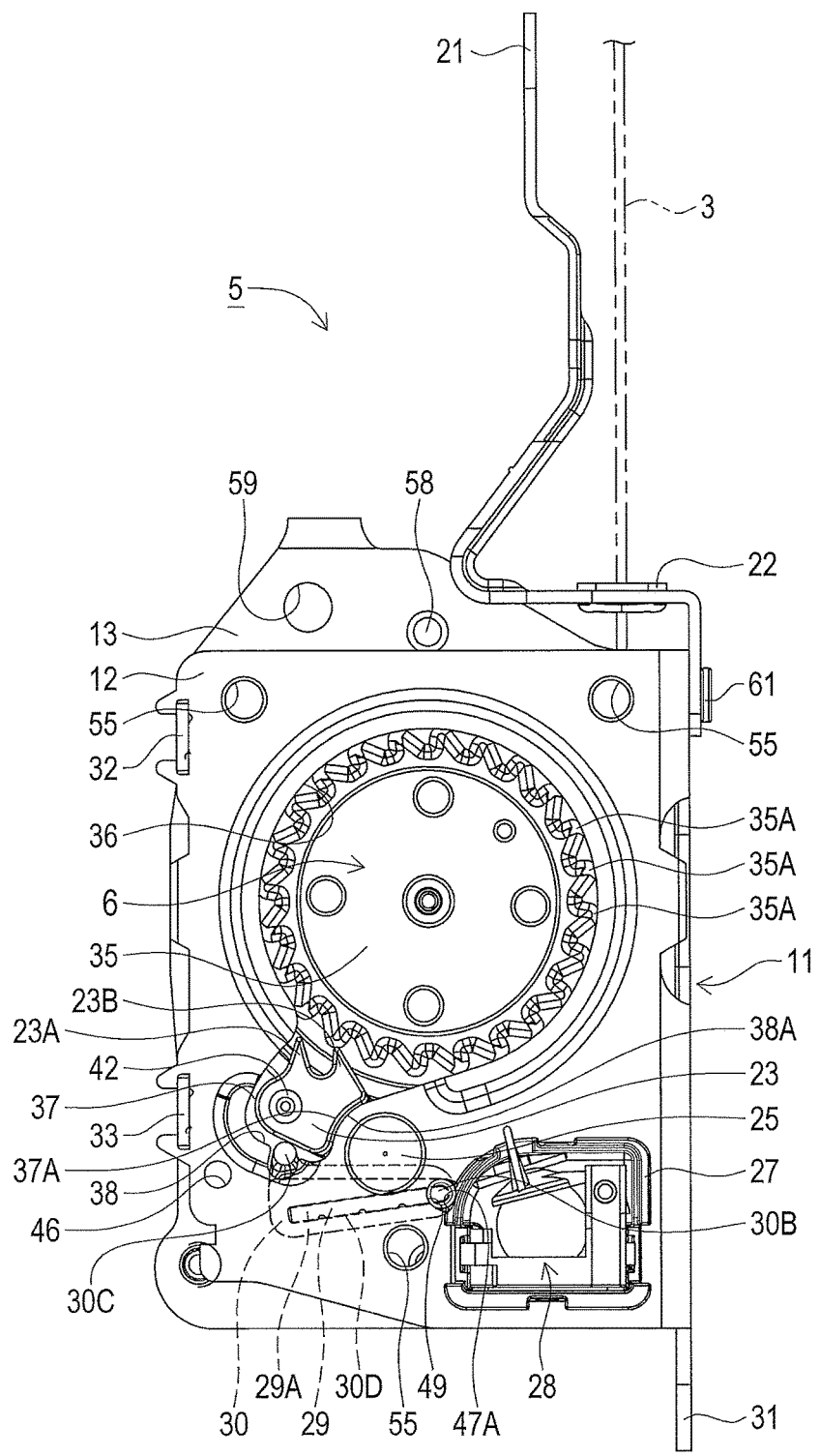
FIG. 7 is a side view of the seatbelt retractor after the locking unit has been removed.

FIG. 6 is an exploded perspective view of the housing unit 5. FIG. 7 is a side view of the seatbelt retractor after the locking unit has been removed.

As illustrated in FIG. 4 through FIG. 7, the housing unit 5 includes the housing 11, a bracket 21, a protector 22, a pawl 23, a pawl rivet 25, a sensor cover 27, an acceleration sensor 28, a connecting member 29, a pressing member 30, fixation members 32, 33 and rivets 61.

The housing 11 has a back plate portion 31 to be fixed to a vehicle body and the side wall portions 12, 13 opposed to each other and extending from both side edge portions of the back plate portion 31. The housing 11 is made of a steel material or the like and is formed to have a substantially square bracket-shape in planar view. The side wall portions 12, 13 are connected to each other with the fixation members 32, 33, each of which has a horizontally long thin plate-like shape, being long in a direction of the rotational axis of the take-up drum unit 6. An opening portion is formed in the center of the back plate portion 31 to help reduce weight and regulate the accommodation amount of the webbing 3.

The side wall portion 12 has a through hole 36 into which a ratchet gear 35 of the take-up drum unit 6 is inserted with a predetermined clearance (for instance, a clearance of approximately 0.5 mm). The inner peripheral portion of the through hole 36 is recessed axially inward with a predetermined depth toward the take-up drum unit 6, opposite to the ratchet gear 35 of the take-up drum unit 6.

At an obliquely lower side of the through hole 36 (obliquely lower left side in FIG. 6), a notch portion 38 is notched out deep enough to receive a portion 37 of the tip end side of the pawl 23 including engagement teeth 23A and 23B. A through hole 41 is formed in the notch portion 38 on the back plate portion 31 side. The through hole 41 is configured to mount the pawl 23 rotatably. At a portion of the notch portion 38 on the through hole 41 side on which the pawl 23 abuts, the notch portion 38 further has a guiding portion 38A formed in the shape of a coaxial arc with the through hole 41.

Meanwhile, the pawl 23 is made of a steel material or the like and has a stepped portion 37A formed at a portion thereof which comes into contact with and slides onto the guiding portion 38A. The stepped portion 37A is formed at approximately the same height as the thickness of the side wall portion 12 and has an arc-like shape with the same radius of curvature as the guiding portion 38A. The pawl 23 further has a guiding pin 42 formed at a portion 37 on the tip end side thereof. A guiding pin 42 is inserted into a guiding grove 142 (refer to FIG. 11) of a clutch 111 which constitutes the locking unit 9.

Further, at a base end portion (one end portion) of the pawl 23, there is formed a through hole 43 into which the pawl rivet 25 is inserted. The through hole 43 has, along the periphery thereof, a boss portion 45 to be rotatably inserted in the through hole 41 of the side wall portion 12. The boss portion 45 has a cylinder shape and is formed at substantially the same height as the thickness of the side wall portion 12. Further, in a state where the boss portion 45 is inserted in the through hole 41 of the side wall portion 12 from the inner side of the housing 11, the pawl rivet 25 is inserted into the through hole 43 from the outer side of the side wall portion 12 to rotatably fix the pawl 23. Accordingly, the engagement teeth 23A, 23B of the pawl 23 and ratchet gear teeth 35A provided on the outer periphery of the ratchet gear 35 are arranged substantially on the same plane as the outer side surface of the side wall portion 12.

Figure 12:
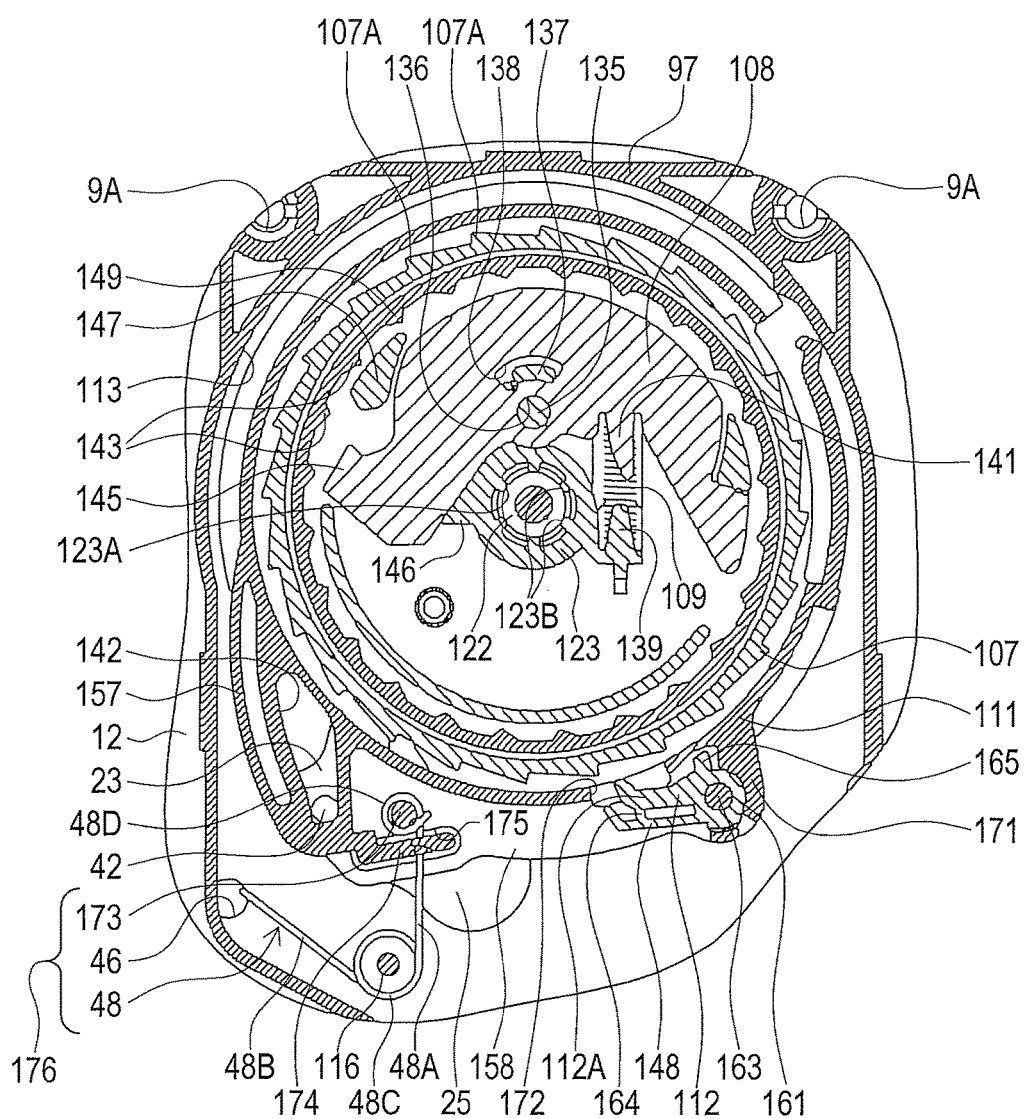
FIG. 12 is a cross sectional view of an assembled state including a locking arm of the locking unit.

A torsion coil spring 48 is formed so that a first arm portion 48A and a second arm portion 48B have a substantially V-letter shape in front view (refer to FIG. 12). The second arm portion 48B is provided so as to be coupled to a tip end of an elastic connecting portion 48C consisting of a number of 3 turns, on the side wall portion 12 side. The first arm portion 48A is provided so as to be coupled to a tip end of the elastic connecting portion 48C on the opposite side with respect to the side wall portion 12. Accordingly, the elastic connecting portion 48C is elastically twisted and deformed in a winding direction in accordance with a relative angular variation in a circumferential direction of the elastic connecting portion 48C of the first arm portion 48A and the second arm portion 48B.

The second arm portion 48B of the torsion coil spring 48 is arranged so as to slide onto and connect with the side wall portion 12 and the tip portion of the second arm portion 48B is bent at a substantially right angle towards an inward direction of the side wall portion 12 (corresponding to a backward direction of the side wall portion 12 in FIG. 6) and is inserted in a mounting hole 46 (refer to FIG. 13) thrilled in the side wall portion 12. The end portion of the second arm portion 48B is bent in a substantially U-letter shape and is formed so as to be capable of abutting onto an inner side face of the side wall portion 12, and therefore constitute a slip-off prevention portion. Also, the first arm portion 48A of the torsion coil spring 48 is mounted to the clutch 111 to be described later (refer to FIG. 12 and FIG. 15).

Further, as illustrated in FIG. 4 through FIG. 7, below the through hole 36 of the side wall portion 12 (downward in FIG. 6), there is formed an opening portion 47 which is substantially square-shaped. The opening portion 47 is formed from a portion below the center axis of the through hole 36 (downward in FIG. 6) toward the back plate portion 31. The sensor cover 27 is fitted into the opening portion 47. The sensor cover 27 has the shape of a shallow box body which is substantially the same square shape as the opening portion 47, and fitted therein from the outside (front side in FIG. 6). Then, the sensor cover 27 made of resin is made to abut on the outer periphery portion of the opening portion 47 (periphery on the front side in FIG. 6) at a brim portion formed at the periphery on the opening thereof. At the same time, as a pair of fixing claws 27A projected at both end faces in the vertical direction in FIG. 6 of the sensor cover 27 (one of the fixing claws 27A on the upper end face is illustrated in FIG. 6) is inserted inward at the both sides in the vertical direction of the opening portion 47 in FIG. 6 and elastically locked.

Further, the acceleration sensor 28 includes a sensor holder 51, an inertia mass body 52 and a sensor lever 53. The sensor holder 51 is made of resin, formed in a substantially box-like shape, opened on the vertically upper side (upper side in FIG. 6) and has a bowl-shaped mounting portion on a bottom face thereof. The inertia mass 52 is made of metal such as steel formed into a spherical body and movably placed on the mounting portion. The sensor lever 53 is made of resin, placed on the vertically upper side of the inertia mass body 52. The sensor holder 51 supports the sensor lever 53 at an end portion opposite to the pawl 23 (right end portion in FIG. 6), in a manner allowing vertical movement (in up/down direction in FIG. 6).

The sensor holder 51 has a pair of engagement claws 51A at both side face portions facing both side wall portions inside the sensor cover 27 (one of the engagement claws 51A is illustrated in FIG. 6). The acceleration sensor 28 is fitted into the sensor cover 27 so that the pair of engagement claws 51A is fitted into and locked at fixing holes 27B of the sensor cover 27. As a result, the acceleration sensor 28 is mounted onto the housing 11 through the sensor cover 27.

The coupling member 29 is formed of a linear member made of a steel material or the like and is shaped as a crank with both ends thereof bent at a substantially right angle so as to face each other at approximately 180 degrees. A bent portion 29A formed at one end side of the coupling member 29 is engaged inside a groove portion 30D formed in a face of the pressing member 30 on the opposite side with respect to the side wall portion 12 and is mounted so as to prevent relative rotation thereof. The arm portion 29B formed at the other end side of the coupling member 29 which has been bent at a substantially right angle is inserted and held inside the pretensioner unit 7 (refer to FIG. 20), as will be described later. When the pressing member 30 is rotatably mounted on the side wall portion 12, a linear portion 29C of the coupling member 29 is engaged inside a supporting groove 57A formed at a lower end portion of the through hole 57 defined at a center portion of the side wall portion 13 and is rotatably supported at the back of the supporting groove 57A formed in a substantially V-letter shape (refer to FIG. 3 and FIG. 8).

The pressing member 30 is made of a synthetic resin such as polyacetal or the like or an aluminum material or the like and is formed of a substantially narrow flat plate having a substantially fan-like shape. When a rib 30A which is slightly taller than the thickness of the bottom end portion of pawl 23 is installed at a right angle on the side wall portion 12 side from a peripheral portion which does not overlap with the bottom end portion side of the pawl 23, a space is formed so as to avoid interference between the side face of the side wall portion 12 of the pressing member 30 and the bottom end portion of the pawl 23, even when the pressing member 30 is arranged so that the bottom end portion of the pawl 23 and the pressing member 30 overlap as shown in FIG. 7.

A boss 30B is projected from the one end portion of the pressing member 30 on the side wall portion 12 side coaxially with the linear portion 29C of the coupling member 29 as engaged in the groove portion 30D. The boss 30B protrudes from the rib 30A on the side wall portion 12 side. As shown in FIG. 6 and FIG. 7, the boss 30B is engaged in the through hole 49 defined between the notch portion 47A and an outer peripheral portion of a sensor cover 27 as engaged in the opening portion 47. The notch portion 47A is formed in a corner of the opening portion 47 on the through hole 41 side and its back side is shaped like an arc.

The boss 30C which protrudes from the rib 30A on the side wall portion 12 side and is inserted inside the notch portion 38 is formed at the other end portion of the pressing member 30 on the side wall portion 12 side. As shown in FIG. 7, this boss 30C either comes in contact with a side face of the pawl 23, in normal state, on the opposite side with respect to the ratchet gear 35 or is positioned in the vicinity of this side face of the pawl 23 in normal state, on the opposite side with respect to the ratchet gear 35. Accordingly, in case of vehicle collision, the pretensioner unit 7 is activated, the coupling member 29 starts rotating and the pressing member 30 is turned towards teeth 35A side of the ratchet gear 35. At this time, the boss 30C acts as a pressing portion which presses the pawl 23 and the pawl 23 is pressed in the boss 30C and turned towards the ratchet gear 35 side to engage with teeth 35A of the ratchet gear 35 (refer to FIGS. 23 through 34). Also, the linear portion 29C of the coupling member 29 constitutes one portion of a coupling portion which connects the arm portion 29B and the boss 30C of the pressing member 30.

Further, the side wall portion 12 has mounting holes 55 into which the nylon latches 9A of the locking unit 9 are fitted, at three locations including both corners of the upper end portion (the upper end portion in FIG. 6) and the portion below the through hole 36 (downward in FIG. 6). Further, engagement pieces 56 are formed at center portions (the center portions in vertical direction in FIG. 6) of right and left edge portions of the side wall portion 12, respectively. The engagement pieces 56 protrude orthogonal to the rotation axis of the take-up drum unit 6. The engagement pieces 56 are elastically engaged with locking hooks 9B of the locking unit 9, respectively.

Further, at a center in the side wall portion 13 is formed a through hole 57 into which the take-up drum unit 6 is inserted. Further, the side wall portion 13 has screw holes 58 into which the screws 15 are screwed and fixed, at three locations including the approximate center of the lower end portion (lower end portion in FIG. 4), the corner on a fixation member 33 side and the corner of the upper end portion (upper end portion in FIG. 4) on the back plate portion 31 side. The screw holes 58 are formed by burring processing toward the pretensioner unit 7 side. The side wall portion 13 has a through hole 59 at the corner closer to a fixation member 32 of the upper end portion (upper end portion in FIG. 4). The stopper pin 16 is inserted through the through hole 59. An extending portion 60 which is projected outwardly at a substantially right angle is formed in a top end portion at the upper side of the through hole 59 and is configured so as to cover the upper side of the pipe cylinder 182 in the pretensioner unit 7.

The bracket 21 is made of steel material or the like, and configured to be attached onto the upper end portion of the back plate portion 31 (the upper end portion in FIG. 4) by the rivets 61. The bracket 21 has a horizontally-long through hole 62, long in a width direction of the back plate portion 31, from which the webbing 3 is drawn out. The through hole 62 is formed in an extension portion extending substantially at a right angle from the upper end portion of the back plate portion 31 toward the connecting member 32. A horizontally long frame-like protector 22 made of synthetic resin such as nylon is fitted inside the through hole 62. A bolt insertion hole 63 is formed at the lower end portion of the back plate portion 31 (the lower end portion in FIG. 4). A bolt is inserted through the bolt insertion hole 63 when mounted onto a fastening piece of a vehicle (not shown).

[Schematic Configuration of Take-up Drum Unit]

Figure 8:
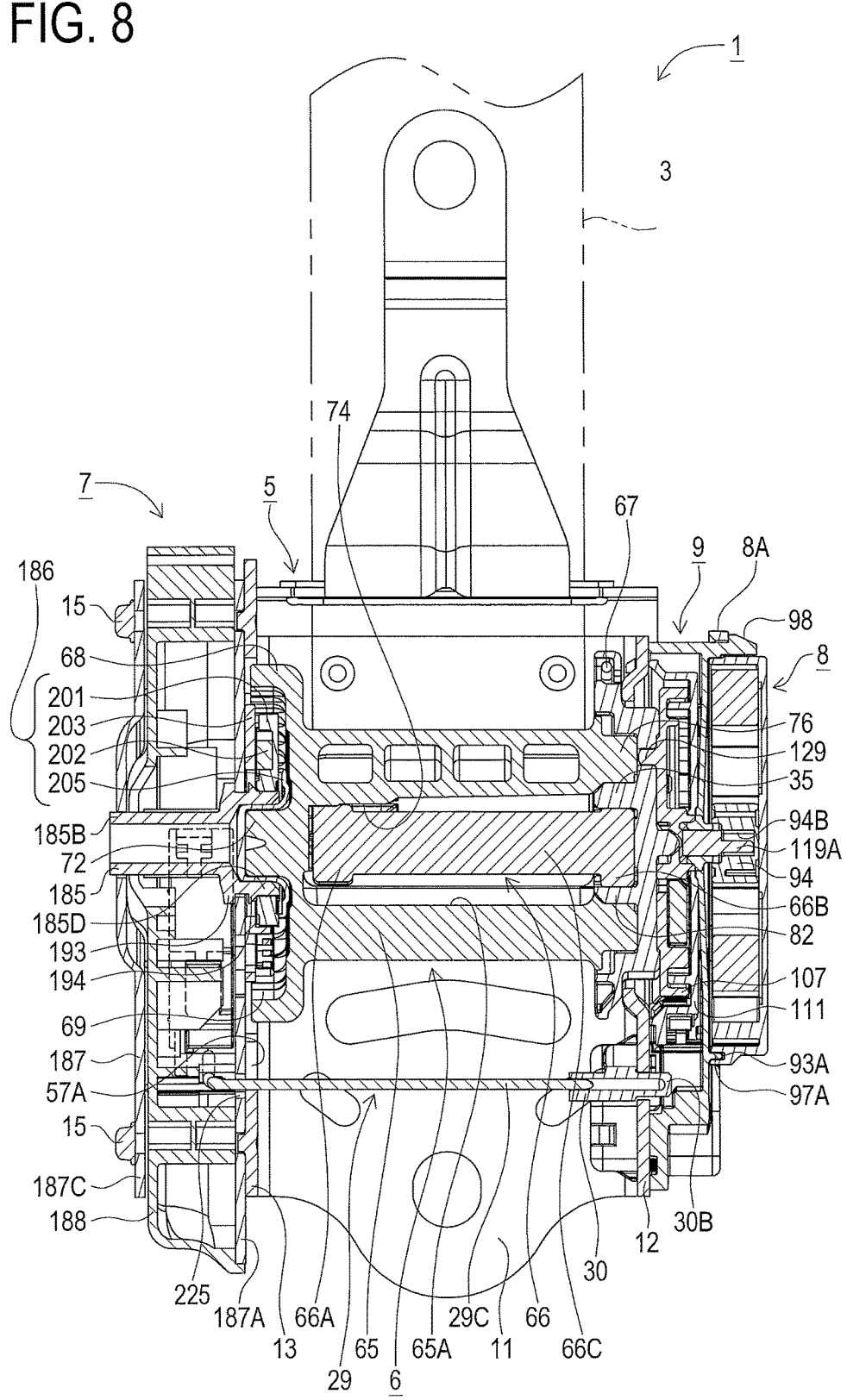
FIG. 8 is a cross-sectional view of the seatbelt retractor shown in FIG. 1.
Figure 9:
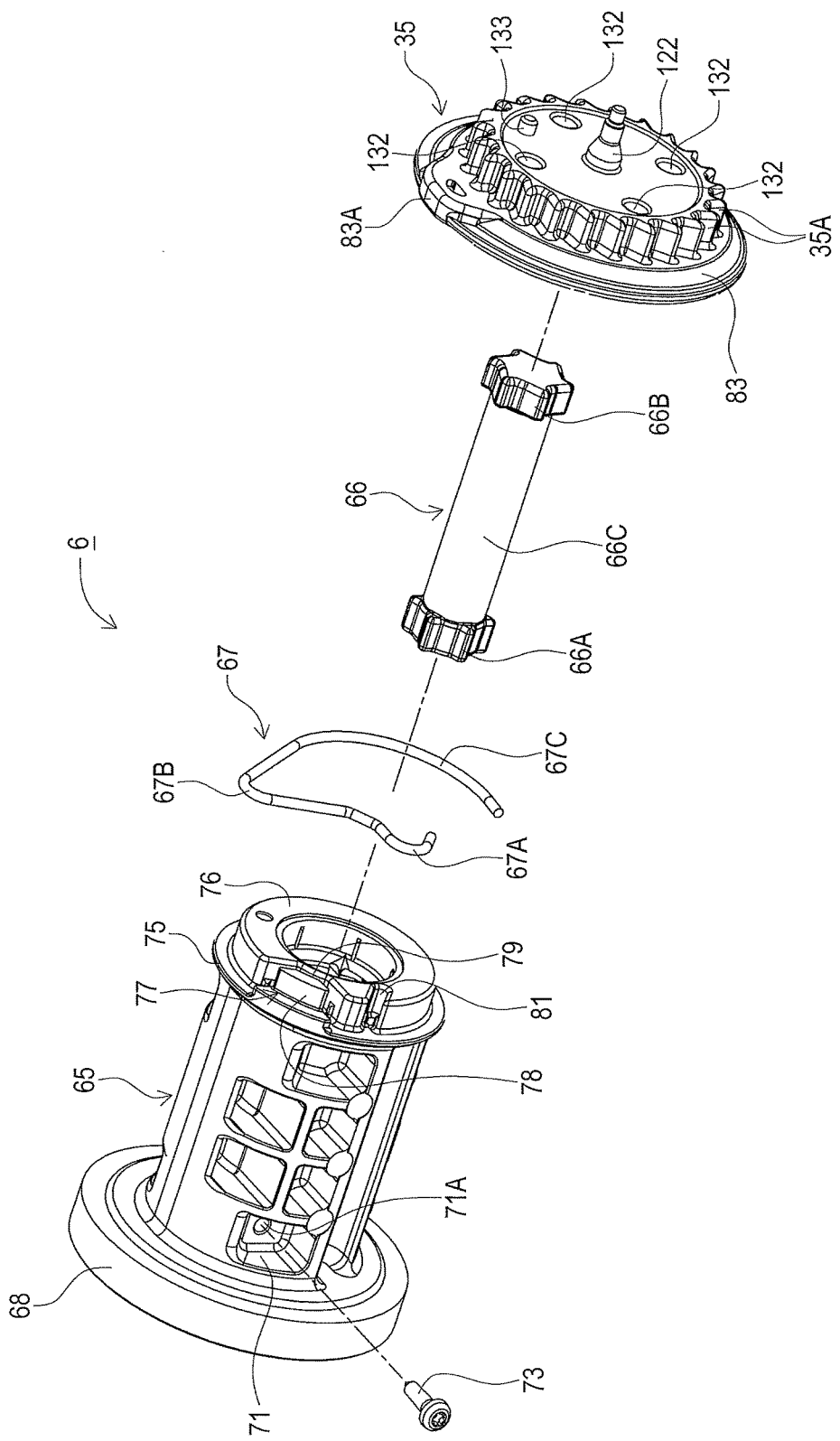
FIG. 9 is an exploded perspective view of the take-up drum unit.

Next, a schematic configuration of the take-up drum unit 6 will be described based on FIG. 4, FIG. 5, FIG. 8 and FIG. 9. FIG. 8 is a sectional view of a seatbelt retractor 1. FIG. 9 is an exploded perspective view of the take-up drum unit 6.

As illustrated in FIG. 8 and FIG. 9, the take-up drum unit 6 includes the take-up drum 65, a torsion bar 66, a wire 67 and the ratchet gear 35.

As illustrated in FIG. 4, FIG. 5, FIG. 8 and FIG. 9, the take-up drum 65 is made by aluminum die-casting, zinc die-casting or the like and is formed in a substantially cylindrical shape, with an end face on the side of the pretensioner unit 7 being walled and closed. On an edge portion of the take-up drum 65 on the pretensioner unit 7 side with respect to axial direction of the take-up drum 65, there is formed a flange portion 68 extending radially and outwardly at substantially right angles (leftward in FIG. 8) from an outer peripheral portion thereof. Further, on the inner circumferential surface of the flange portion 68, there is formed an internal gear 69 which engages with clutch pawls 202 (refer to FIG. 16) in case of vehicle collision to transmit the rotation of a pinion gear 185 (refer to FIG. 16).

A cylindrical boss 72 is erected on the center position of the end face portion on the pretensioner unit 7 side of the take-up drum 65. The boss 72 is fitted into a bearing 205 formed of synthetic resin material such as polyacetal, and the base end portion of the boss 72 abuts on the bearing 205. Accordingly, one side of the take-up drum unit 6 is rotatably supported, via the bearing 205, at a boss portion 185D (refer to FIG. 16) of the pinion gear 185 making up the pretensioner unit 7.

The take-up drum 65 has a shaft hole 65A formed inside thereof. The shaft hole 65A has a draft angle in a manner gradually tapering along a center axis. The shaft hole 65A has a spline groove 74 formed therein on the side closer to the flange portion 68. The spline groove 74 is configured to press-fittingly receive a spline 66A formed at one end portion of the torsion bar 66 made of a steel material or the like.

The torsion bar 66 is made of a steel material or the like, and includes a shaft portion 66C of a stick-like shape and circular in cross section, and splines 66A, 66B formed on both ends of the shaft portion 66C. The torsion bar 66 is relatively non-rotatably press-fitted inside the take-up drum 65, by pressingly inserting the spline 66A side of the torsion bar 66 into the shaft hole 65A of the take-up drum 65 until coming into contact with the flange portion 68.

As shown in FIG. 9, a mounting concave portion 71 is formed in the vicinity of a side end portion of the flange portion 68 in the take-up drum 65. The mounting concave portion 71 has a substantially rectangular shape in cross section and is recessed by a predetermined depth in a direction intersecting a rotational axis direction of the take-up drum 65. A mounting hole 71A which passes through the inside of the shaft hole 65A is formed in the mounting concave portion 71 at a substantially central position of a bottom face portion thereof, in a direction intersecting a rotational axis direction of the take-up drum 65. Then, a fixing screw 73 made of a steel material or the like is threaded in the mounting hole 71A to press the spline 66A of the torsion bar 66 in a circumferential direction to secure it. More specifically, the spline 66A of the torsion bar 66 is secured inside the take-up drum 65 by the fixing screw 73 in a fashion not allowing relative rotation thereof in a circumferential direction and rotational axis direction.

Further, at an end portion of the take-up drum 65 axially on the locking unit 9 side, there is formed a flange portion 75 having substantially circular shape in front view, radially extending on the inner circumferential surface slightly axially inward from the end portion. Further, at a portion axially outward from the flange portion 75, a cylindrical stepped portion 76 is formed in a shape with slightly narrower outer diameter. The stepped portion 76 is provided so as to surround the spline 66B on the other side of the torsion bar 66 which is press-fitted inside the shaft hole 65A, forming a predetermined clearance.

Further, there is integrally formed a holding-side crooked path 77 on the outer peripheral portion of the stepped portion 76 formed on the outer side surface with respect to an axial direction of the flange portion 75, having a substantially circular shape in front view, as a part thereof. A crooked portion 67A at one end of linear wire 67 made of a metal material such as stainless material and having a circular cross section is fixedly held at the holding-side crooked path 77.

Further, the ratchet gear 35 is made by aluminum die-casting, zinc die-casting or the like, has a substantially ring shape in axial cross section and has the ratchet gear teeth 35A formed on the outer periphery thereof. A cylindrical fixation boss 82 is erected at an inner center position of the ratchet gear 35. The inner peripheral face of the fixation boss 82 has a spline groove formed therein into which the spline 66B formed on the other end side of the torsion bar 66 is press-fitted. Further, the inner peripheral portion of the ratchet gear teeth 35A is configured to have such an inner diameter as to allow insertion of the stepped portion 76 of the take-up drum 65.

The ratchet gear 35 has a flange portion 83 extending radially outward across an entire periphery thereof from the end face portion on the take-up drum 65 side of the teeth 35A of the ratchet gear 35. The flange portion 83 has a ring-like shape in front view, extending radially further outward than the outer diameter of the flange portion 75 of the take-up drum 65. Further, the ring-shaped flange portion 83 extends in a plate-like shape in an obliquely inward direction from an outer peripheral portion. Further, the outer diameter of the flange portion 83 has substantially the same size as the outer diameter of the flange portion 68 of the take-up drum 65.

A trapezoid-like portion 83A is formed in the flange portion 83. A convex portion 84 (refer to FIG. 11) having substantially a V-letter shape in front view is formed substantially at a center portion on an inner side face of the trapezoid-like portion 83A on the take-up drum 65 side, and projects outward from the trapezoid-like portion 83A in an rotational axis direction. The crooked portion 67B of the wire 67, substantially inverted U-shaped in front view, is fitted inside the convex portion 84.

Further, a flange portion 85 (refer to FIG. 11) is formed on the inner side surface of the flange portion 83 on the take-up drum 65 side. The flange portion 85 has an inner diameter slightly larger than the outer diameter of the flange portion 75 of the take-up drum 65, is erected along the outer circumference portion of the trapezoid-like portion 83A. Further, the inner periphery of the flange portion 85 and the outer periphery of the convex portion 84 make up a deformation-giving crooked path that is substantially inverted U-shaped in front view. The wire 67 is guided and pulled out through the deformation-giving crooked path.

In order to attach the ratchet gear 35 onto the take-up drum 65, the fixation boss 82 of the ratchet gear 35 is inserted inside the stepped portion 76 of the take-up drum 65, and the spline 66B formed on the other end side of the torsion bar 66 is press-fitted inside the spline groove of the fixation boss 82. The wire 67 is thus arranged between the flange portion 75 of the take-up drum 65 and the flange portion 83 of the ratchet gear 35. The ratchet gear 35 is mounted in a relatively non-rotatable fashion with respect to the take-up drum 65 via the torsion bar 66.

[Schematic Configuration of Take-up Spring Unit]

Figure 10:
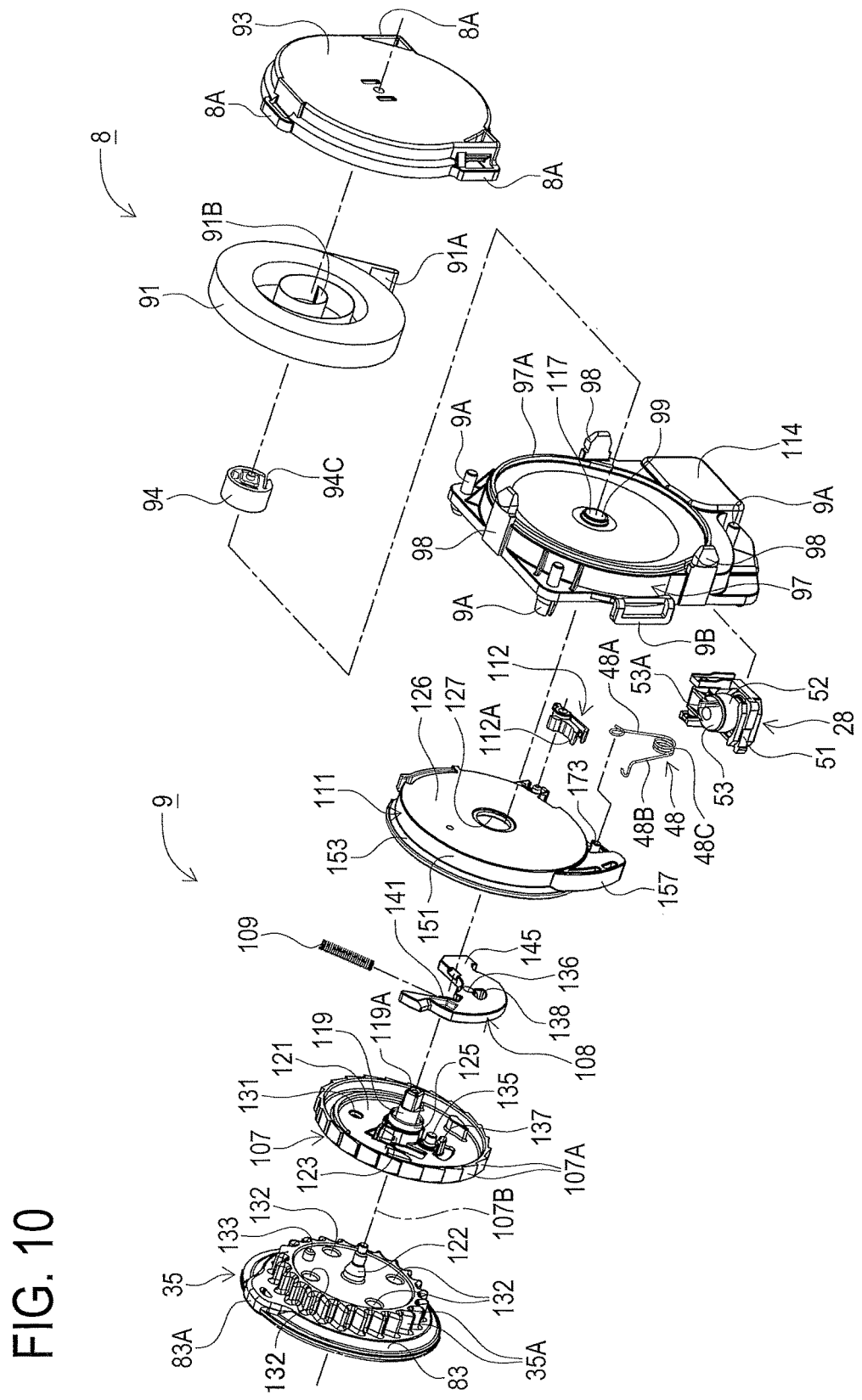
FIG. 10 is an exploded perspective view of a ratchet gear, a take-up spring unit and a locking unit.
Figure 11:
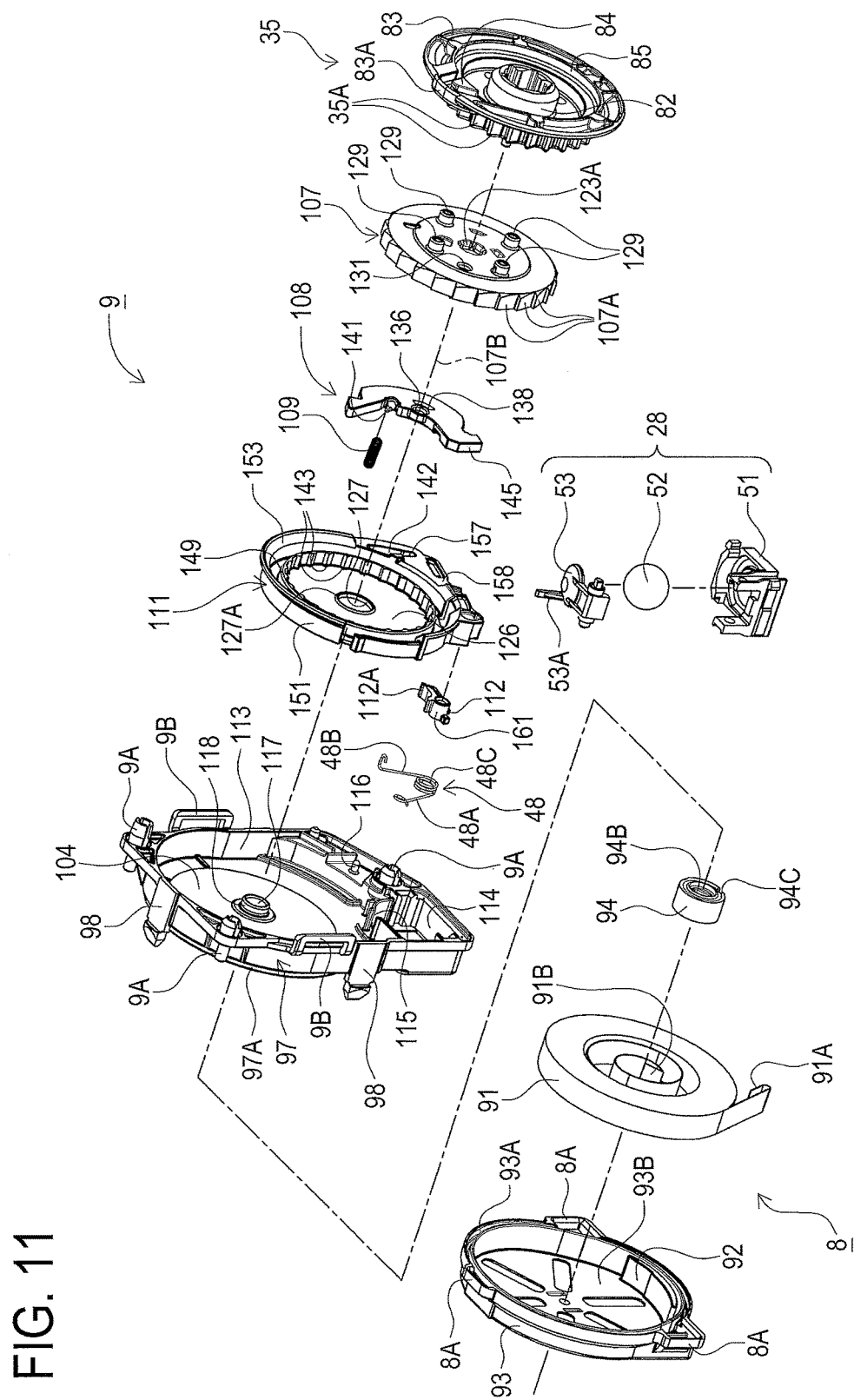
FIG. 11 is an exploded perspective view of the ratchet gear, the take-up spring unit and the locking unit.

Next, a schematic configuration of the take-up spring unit 8 will be described based on FIG. 4, FIG. 5, FIG. 8, FIG. 10, and FIG. 11. FIG. 10 and FIG. 11 each are exploded perspective views of the locking unit 9 and the take-up spring unit 8 including the ratchet gear 35.

As illustrated in FIG. 4, FIG. 5, FIG. 8, FIG. 10 and FIG. 11, the take-up spring unit 8 has a spiral spring 91, a spring case 93 and a spring shaft 94. The spring case 93 fixes an outer end 91A of the spiral spring 91 at a rib 92 projected from the bottom surface of the inner peripheral portion thereof, and accommodates this spiral spring 91. In the spring shaft 94, an inner end 91B of the spiral spring 91 is fitted in a mounting groove 94c so that the spring shaft 108 is urged by the spring force.

The respective elastic engagement pieces 98 protruding in the back face side from three locations of the outer peripheral portion of the mechanism cover 97 are fitted inside and elastically engage with the respective locking hooks 8A provided at three locations of the outer peripheral portion of the spring case 93. The take-up spring unit 8 thus comes in contact with the back face side of the locking unit 9 and is secured. Also, the front end portion 119A of the rotational axis portion 119 in the locking gear 107 is fitted inside a cylindrical hole 94B of the spring shaft 94. The front end portion 119 and the cylindrical hole 94B are formed in a rectangular shape in cross-section.

[Schematic Configuration of Locking Unit]

Next will be described a schematic configuration of the locking unit 9 composing the lock mechanism 10 that stops the pull-out of the webbing 3 in response to the abrupt pull-out of the webbing 3 or abrupt change in acceleration of a vehicle, while referring to FIG. 8, FIG. 10 through FIG. 15.

Figure 13:
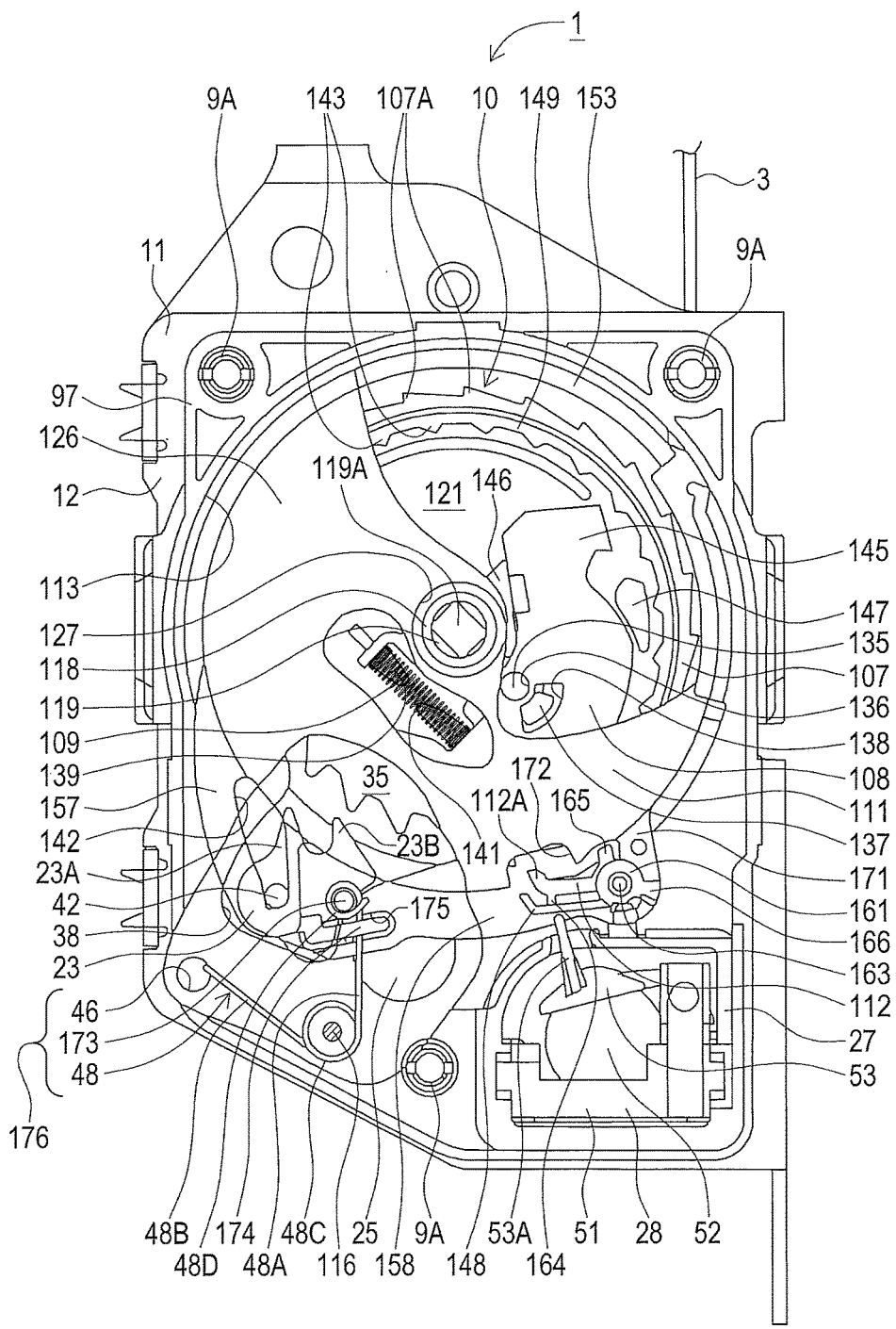
FIG. 13 is a partial cutaway sectional view showing the locking unit with a bottom face portion of a mechanism cover partially cutaway.
Figure 14:
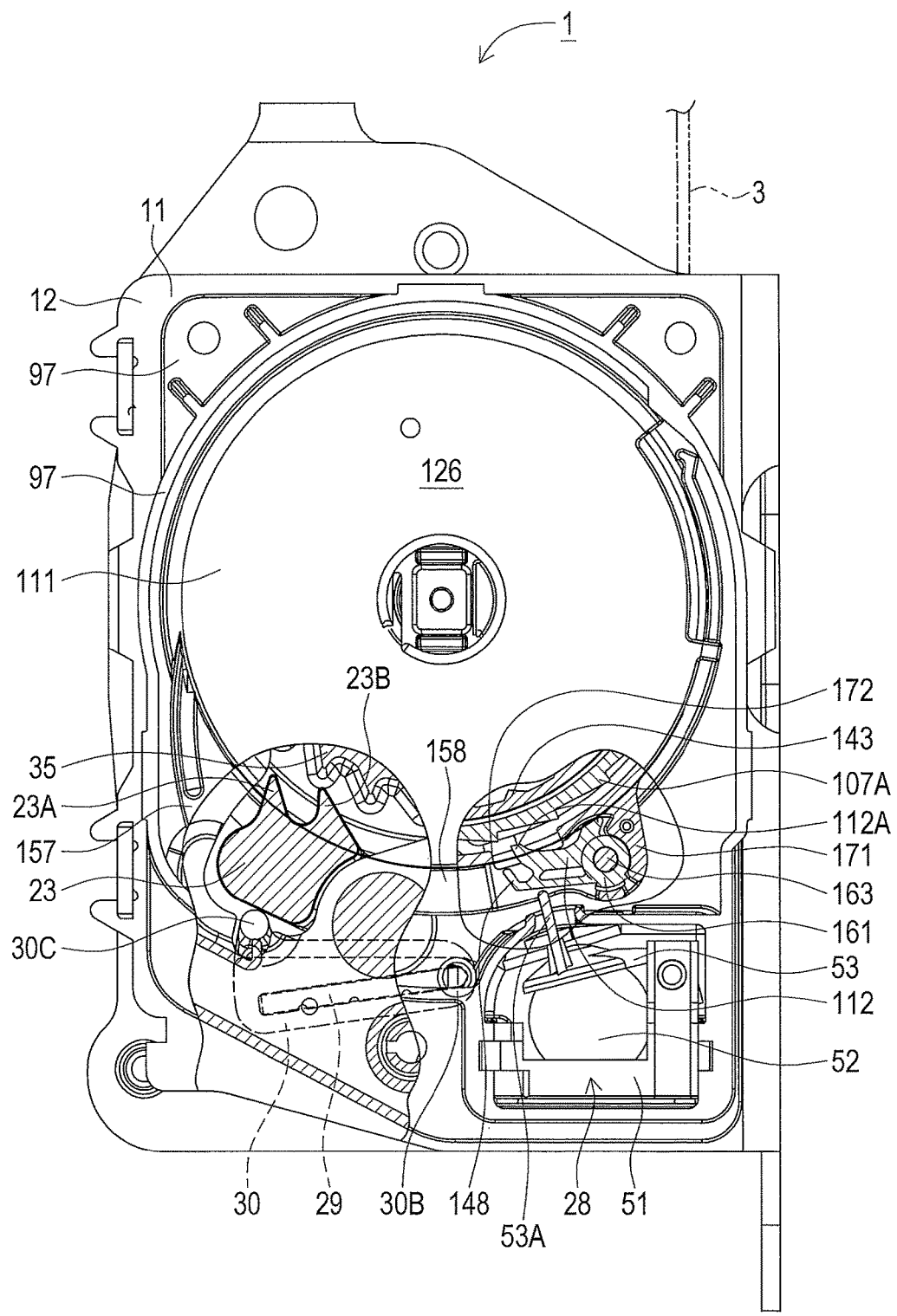
FIG. 14 is a partial cutaway sectional view showing the locking unit with a bottom face portion of a mechanism cover partially cutaway.
Figure 15:
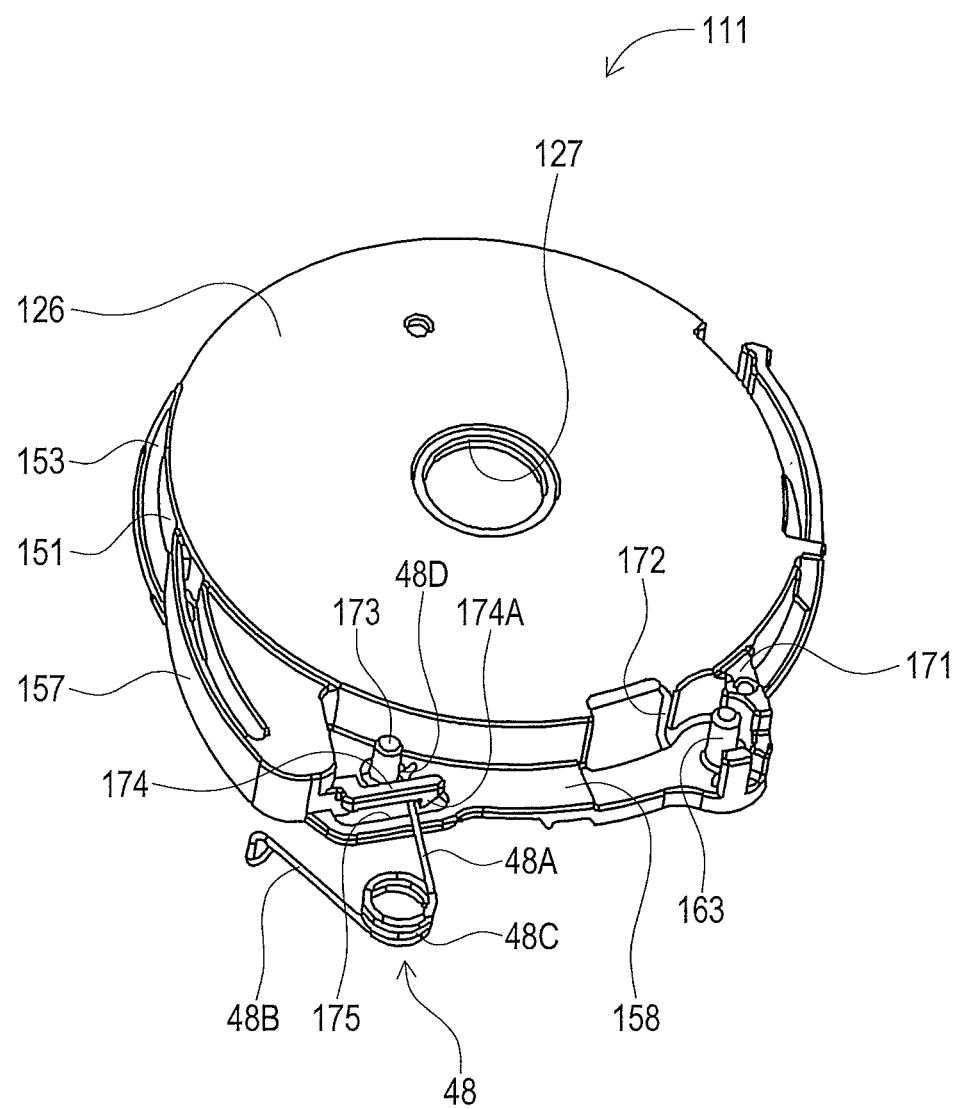
FIG. 15 is a perspective view showing a condition wherein a torsion coil spring is mounted to the clutch.

FIG. 12 is a cross sectional view of an assembled state including a locking arm 108 of the locking unit 9. FIG. 13 is a partial cutaway sectional view showing the locking unit 9 with a bottom face portion 104 of a mechanism cover 97 partially cut away. FIG. 14 is a partial cutaway sectional view showing the locking unit 9 with a bottom face portion 104 of a mechanism cover 97 partially cut away. FIG. 15 is a perspective view showing a condition wherein a torsion coil spring is mounted to the clutch.

As illustrated in FIG. 8, FIG. 10 through FIG. 14, the locking unit 9 includes the mechanism cover 97, the locking gear 107, a locking arm 108, a sensor spring 109, a clutch 111, the twisted coil spring 48 and a pilot lever 112. In the present embodiment, the members included in the locking unit 9 are made of synthetic resin except the sensor spring 123 and the twisted coil spring 48. Thus, friction coefficient of contact between the members is quite small.

The mechanism cover 97 has a substantially box-shaped mechanism housing portion 113 having a bottom face portion 104 formed in a substantially circular shape and opened on the side facing the side wall portion 12 of the housing 11, to house the locking gear 107, the clutch 111, and the like. Further, the mechanism cover 97 has a sensor housing portion 114 connected to the mechanism housing portion 113, at a corner thereof (lower left corner in FIG. 11) facing the acceleration sensor 28 mounted to the housing 11 via the sensor cover 27. The sensor housing portion 114 has a concave shape being rectangular in cross section.

The sensor holder 51 of the acceleration sensor 28 is configured to be fitted into the sensor housing portion 114 when the mechanism cover 97 is attached to the side wall portion 12 by the nylon latches 9A and the locking hooks 9B, so that the sensor lever 53 is housed in a vertically movable manner (in up/down direction in FIG. 14). Further, an opening portion 115 is opened to allow communication between the mechanism housing portion 113 and the sensor housing portion 114, at substantially the middle of the lower end portion of the mechanism housing portion 113 of the mechanism cover 97 (substantially middle of the lower end portion in FIG. 10).

This opening portion 115 is formed to allow vertical movement (in up/down direction in FIG. 14) of the tip portion of a lock claw 53A. The lock claw 53A is projected in upward direction (upward in FIG. 11) from a tip end portion of the sensor lever 53 of the acceleration sensor 28. In normal time, the tip portion of the lock claw 53A is positioned in the vicinity of a receiving plate portion 148 of the pilot lever 112 (refer to FIG. 13). As later described, when the inertia mass body 52 is moved in response to acceleration exceeding a predetermined value to pivotally move the sensor lever 53 vertically upward, the lock claw 53A abuts on the receiving plate portion 148 of the pilot lever 112 through the opening portion 115 to pivotally move the pilot lever 112 vertically upward (refer to FIG. 13).

As shown in FIGS. 11 through 13, the mechanism cover 97 has an insertion pin 116 formed in a corner (corresponding to a lower right corner in FIG. 11) opposite the pawl 23 mounted at the housing 11 which is inserted inside the elastic connecting portion 48C of the torsion coil spring 48. The insertion pin 116 is adapted to regulate a large position shift of the elastic connecting portion 48C.

As illustrated in FIG. 8, FIG. 10 through FIG. 13, the mechanism housing portion 113 has a cylindrical support boss 118 projected at a periphery of the through hole 117 formed in the center of the substantially circular-shaped bottom face portion 104 thereof. Further, the locking gear 107 has a disk-like bottom face portion 121 provided with the cylindrical rotational axis portion 119 projected at the center portion thereof. The cylindrical rotational axis portion 119 is inserted onto the support boss 118, and supported thereon slidably and rotatably.

The locking gear 107 is formed as a circular ring-like projection projecting toward the clutch 111 side on the whole periphery of the disk-like bottom face portion 121 and has locking gear teeth 107A configured to engage with the pilot lever 112 on the outer peripheral portion thereof. A locking gear tooth 121A is formed to engage with an engagement claw portion 112A of the pilot lever 112 only when the locking gear 107 is rotated in the webbing pull-out direction.

The center portion of the bottom face portion 121 of the locking gear 107 has a shaft hole portion 123A, which fittingly receives a shaft portion 122 projecting at the center portion of the end face of the ratchet gear 35 on the locking gear 107 side. Further, a cylindrical pedestal portion 123 is formed projecting at the peripheral portion of the shaft hole portion 123A on the mechanism cover 97 side, at a height substantially similar to the height in an axial direction of the locking gear teeth 107A. Further, the cylindrical rotational axis portion 119 of the locking gear 107 extends co-axially from the edge portion of the cylindrical pedestal portion 123 on the mechanism cover 97 side, at an outer diameter smaller than the pedestal portion 123 and substantially the same diameter as the inner diameter of the support boss 118, toward the mechanism cover 97 side. The tip portion 119A having a rectangular cross-sectional shape is coaxially extended from the end portion on the mechanism cover 97 side of the rotational axis portion 119.

Around the base end portion of the rotational axis portion 119, a circular ring-like rib 125 is co-axially formed, at a height substantially the same as the thickness dimension of a substantially disk-like plate portion 126 of the clutch 111. Further, the outer diameter of the circular ring-like rib 125 is formed substantially the same as the inner diameter of a through hole 127 formed at the center portion of the plate portion 126 of the clutch 111, and at the same time, smaller than the outer diameter of the pedestal portion 123.

Accordingly, the circular ring-like rib 125 of the locking gear 107 is fittingly inserted into the through hole 127 of the clutch 111, and then the rotational axis portion 119 is inserted into the support boss 118 of the mechanism cover 97. Then the tip portion of the support boss 118 is made to abut on the bottom face portion of the insertion groove formed radially inside the circular ring-like rib 125. Further, the circular ring-like rib 125 of the locking gear 107 is inserted into the through hole 127 in a slidable and rotatable fashion, and the clutch 111 is housed between the locking gear 107 and the mechanism cover 97, rotatably within a predetermined rotation range.

As illustrated in FIG. 8, FIG. 10 and FIG. 11, the locking gear 107 has four convex portions 129 formed so as to project in a columnar shape, on the end face thereof on the ratchet gear 35 side. The four convex portions 129 are positioned at equal center angles, on a concentric circle a predetermined distance away (for instance, approximately 14 mm away) from a rotational axis 107B, radially outward. On a bottom portion 121 of the locking gear 107, a positioning hole 131 having a predetermined inner diameter (for instance, inner diameter of approximately 3.5 mm) is formed at a substantially center position between one pair of convex portions 129 neighboring in circumferential direction.

Further, the ratchet gear 35 has four circular through holes 132 each having substantially the same inner diameter as the outside diameter of the convex portion 129 of the locking gear 107. The four circular through holes 132 are positioned at equal center angles, radially outwardly a predetermined distance away (for instance, approximately 14 mm away) from a rotational axis 107B, at positions corresponding to the convex portions 129, respectively. Further, the end face portion facing the locking gear 107 of the ratchet gear 35 has a positioning pin 133 erected at a position between one pair of through holes 132 neighboring in circumferential direction, the position opposite to the positioning hole 131. The positioning pin 133 has substantially the same outer diameter as the inner diameter of the positioning hole 131.

Accordingly, the shaft portion 122 of the ratchet gear 35 is inserted into the shaft hole portion 123A of the locking gear 107, the positioning pin 133 of the ratchet gear 35 is fitted into the positioning hole 131 of the locking gear 107, and at the same time, each convex portion 129 of the locking gear 107 is fitted into the respective through hole 132 of the ratchet gear 35. As a result, with the locking gear 107 abutting on the axially outer end face of the ratchet gear 35, the locking gear 107 is co-axially mounted onto the ratchet gear 35 so as to be relatively non-rotatable.

Further, as illustrated in FIG. 10 through FIG. 13, a columnar support boss 135 is erected on the surface of the bottom face portion 121 of the locking gear 107 on the clutch 111 side. The columnar support boss 135 is erected adjacent to the pedestal portion 123, at a height lower than the locking gear teeth 107A. A locking arm 108 made of synthetic resin is formed to have substantially an arch shape so as to surround the pedestal portion 123. In the locking arm 108, a through hole 136 is formed in the edge portion at substantially the center portion in longitudinal direction on the pedestal portion 123 side, and the columnar support boss 135 is rotatably inserted into the through hole 136 so that the locking arm 108 is rotatably supported.

Further, as illustrated in FIG. 12 and FIG. 13, in the locking gear 107, a spring supporting pin 139 is projected on the rib portion extending radially outward from the outer periphery of the pedestal portion 123. One end side of the sensor spring 109 is fitted into the spring supporting pin 139. The spring supporting pin 139 is projected in a webbing pull-out direction perpendicular to the axial center of the pedestal portion 123. Further, at the locking arm 108, a spring supporting pin 141 is projected on the side wall facing the spring supporting pin 139, and the other end side of the sensor spring 109 is fitted into the spring supporting pin 141.

Accordingly, as illustrated in FIG. 10 through FIG. 13, when both ends of the sensor spring 109 are engaged with the spring supporting pins 139, 141, respectively, the locking arm 108 is urged, with a predetermined load, so as to rotate toward the webbing pull-out direction side (counterclockwise direction in FIG. 12) with respect to the center axis of the support boss 135. Further, the locking arm 108 has an engagement claw 145 configured to engage with a clutch gear 143 of the clutch 111, and at an edge portion on the engagement claw 145 side, abuts onto a stopper 146 projecting radially outward from the pedestal portion 123 of the locking gear 107.

Meanwhile, as later described, when the locking arm 108 is rotated in a webbing take-up direction (clockwise direction in FIG. 12) against the urging force of the sensor spring 109 and engages with the clutch gear 143, an edge portion opposite to the engagement portion of the engagement claw 145 forms a predetermined clearance (for instance, approximately 0.3 mm clearance) with a rotation restrictor 147 formed at the bottom face portion 121 of the locking gear 107. The rotation restrictor 147 is spindle-shaped in cross section.

Further, as illustrated in FIG. 10 through FIG. 15, the clutch 111 is housed rotatably within a predetermined rotation range in the mechanism housing portion 113, while being held between the locking gear 107 and the mechanism cover 97. On the locking gear 107 side of the clutch 111, there is provided a circular ring-like rib portion 149. The circular ring-like rib portion 149 is co-axially formed with regard to the through hole 127, and has a slightly smaller outer diameter than the inner circumference diameter of the circular ring-like rib of the locking gear 107 having the locking gear teeth 107A on the outer periphery portion thereof.

The rib portion 149 has the clutch gear 143 configured to engage with the engagement claw 145 of the locking arm 108, on the inner periphery thereof. The clutch gear 143 is to engage with the engagement claw 145 of the locking arm 108 only when the locking gear 107 is rotated in the webbing pull-out direction with respect to the axis of the through hole 127.

Further, a circular ring-like outer rib portion 151 is formed at the outer peripheral portion of the substantially disk-like plate portion 126 of the clutch 111, so as to surround the rib portion 149. Further, across substantially the entire periphery of the edge portion of the outer rib portion 151 on the ratchet gear 35 side, a flange portion 153 is formed, extending radially outward with respect to the central axis of the through hole 127, being slightly slanted toward the ratchet gear 35 side.

The outer rib portion 151 has a guiding block portion 157 which extends at a corner facing the pawl 23 (lower left corner portion in FIG. 10). The guiding block portion 157 extends from the outer periphery of the outer rib portion 151 downward in a vertical direction (downward in FIG. 10). The guiding block portion 157 has a long guiding groove 142 into which the guiding pin 42 formed on the side face of the tip portion including engagement teeth 23A, 23B of the pawl 23 is movably engaged from the ratchet gear 35 side. As illustrated in FIG. 10, an end face of the long guiding groove 142 is walled and closed on the side of the mechanism cover 97.

The guiding groove 142 is, as illustrated in FIG. 13, formed at a corner portion facing the pawl 23 of the clutch 111 into a long groove-like shape substantially parallel to the webbing pull-out direction (vertical direction in FIG. 13). Accordingly, when the clutch 111 is rotated in the webbing pull-out direction (counterclockwise direction in FIG. 13), the guiding pin 42 is moved along the guiding groove 142, and the engagement teeth 23A, 23B of the pawl 23 are rotated so as to come closer to the ratchet gear teeth 35A of the ratchet gear 35.

Further, as illustrated in FIG. 10 through FIG. 15, an extending portion 158 is formed in a plate-like shape, extended radially outward in substantially an arc-like shape from the flange portion 153, on the lower edge portion of the outer rib portion 151 of the clutch 111 (lower edge portion in FIG. 10). The extending portion 158 extends from the end face portion of the guiding block portion 157 on the ratchet gear 35 side, to the portion facing the upper portion of the sensor housing portion 114 (upper direction in FIG. 11). Further, in the vicinity of the edge portion opposite to the guiding block portion 157, the extending portion 158 has a mounting boss 163 provided on the mechanism cover 97 side at substantially the same height as the outer rib portion 151. The mounting boss 163 has a thin columnar shape and is inserted into a cylindrical sleeve portion 161 of the pilot lever 112.

Here, as illustrated in FIG. 12 and FIG. 13, the pilot lever 112 includes the cylindrical sleeve portion 161, the plate-like engagement claw portion 112A, the thin-plate-like receiving plate portion 148, and a thin-plate-like connecting plate portion 164. The length of the sleeve portion 161 in axial direction is set substantially the same as the height of the mounting boss 163 erected on the extending portion 158. Further, the plate-like engagement claw portion 112A is formed substantially L-shaped when viewed in the rotation axis direction, with the tip portion thereof obliquely bent toward the locking gear 107 side. Further, the plate-like engagement claw portion 112A is projected from the outer periphery of the sleeve portion 161 to the guiding groove 142 side, in a predetermined length and at a width shorter than the length of the sleeve portion 161. The plate-like engagement claw portion 112A is projected so as to be substantially horizontal when the pilot lever 112 is rotated by its own weight to regulate downward rotation in vertical direction.

Further, the thin-plate-like receiving plate portion 148 is projected from the outer periphery of the sleeve portion 161 to the guiding groove 142 side in tangential direction so as to face the engagement claw portion 112A, and a tip portion thereof is obliquely bent so as to be substantially parallel with the tip side of the engagement claw portion 112A. The thin-plate-like connecting plate portion 164 is formed to connect the tip portions of the engagement claw portion 112A and the receiving plate portion 148.

In the vicinity of the base end portion of the engagement claw portion 116A, an upward rotation restrictor portion 165 is projected radially outward from the outer periphery of the sleeve portion 161. The upward rotation restrictor portion 165 regulates the rotation of the pilot lever 112 in the direction of the locking gear 107 side, namely, the rotation upward in a vertical direction. Further, the upward rotation restrictor portion 165 is projected at substantially the same width dimension as the width of engagement claw portion 112A and at a predetermined height (for instance, approximately 1.5 mm high) so as to form a substantially right angle with the base end portion of the engagement claw portion 112A.

The sleeve portion 161 has a downward rotation restrictor portion 166 on a side opposite a tangential direction with respect to the receiving plate portion 148. The downward rotation restrictor portion 166 projects radially outward from an outer circumferential surface of the sleeve portion 161, and restricts the rotation of the pilot lever 112 in a direction of the sensor lever 53 side, in other words, the rotation in vertically downward direction. The downward rotation restrictor portion 166 projects, from the end surface side opposite to the ratchet gear 35 of the sleeve portion 161, at a width dimension in the rotational axis direction narrower than the width of receiving plate portion 148 in the rotational axis direction and at a predetermined height (for instance, approximately 1.5 mm high) so as to face the base end portion of the receiving plate portion 148.

As illustrated in FIG. 12 through FIG. 15, a pilot lever supporting block 171 is formed at a peripheral portion of the extending portion 158 facing the mounting boss 163, extending towards the mechanism cover 97 side at substantially the same height as the outer rib portion 151. The inner side surface of the pilot lever supporting block 171 facing the mounting boss 163 is formed concentrically with the mounting boss 163, as a smooth curved surface having a substantially semicircular shape in front view, with a curvature radius that is slightly larger (for instance, approximately 0.1 mm larger) than the radius of the outer periphery of the sleeve portion 161 in the pilot lever 112.

An opening portion 172 is formed at a position in the outer rib portion 151 facing the engagement claw portion 112A of the pilot lever 112 and penetrates vertically. The opening portion 172 is notched out by a predetermined width in the circumferential direction towards the inner side with respect to the edge portion of the plate portion 126. The opening portion 172 is configured to allow the engagement claw portion 112A to be inserted inside the opening portion 172 and engage with the locking gear teeth 107A, when the engagement claw portion 112A is pressed and rotated by the lock claw 53A of the sensor lever 53.

Further, as illustrated in FIG. 12 through FIG. 14, when the pilot lever 112 is rotated by its own weight downward in a vertical direction (downward direction in FIG. 13), the downward rotation restrictor portion 166 comes in contact with the pilot lever supporting block 171 to regulate the rotation angle downward in a vertical direction (downward in FIG. 13). Further, in a normal state, the receiving plate portion 148 of the pilot lever 112 and the lock claw 53A of the sensor lever 53 have a clearance formed therebetween.

When the sensor lever 53 is rotated vertically upward (in upward direction in FIG. 13), and the pilot lever 112 is rotated by the lock claw 53A vertically upward, the engagement claw portion 112A of the pilot lever 112 comes into contact with the locking gear 107 and engages with a locking gear tooth 107A. Further, when the locking gear 107 is rotated in the webbing pull-out direction (counterclockwise direction in FIG. 13), with the engagement claw portion 112A of the pilot lever 112 being engaged with the locking gear tooth 107A, the engagement claw portion 112A is subject to a load in the mounting boss 163 side direction.

As shown in FIG. 10, FIG. 12, FIG. 13 and FIG. 15, a spring fixing pin 173 is erected at a substantially center portion in a width direction of the extending portion 158 (in FIG. 13, vertical direction) and is slightly shorter than the outer rib portion 151, defining a predetermined clearance (for instance a clearance of approximately 4 mm) with the guide block portion 157 in an edge portion of the extending portion 158 on the guide block portion 157 side.

As shown in FIG. 12 and FIG. 13, a mounting portion 48D formed at a front end of the first arm portion 48A of the torsion coil spring 48 is mounted to the spring fixing pin 173 of the clutch 111. In this condition, the front end portion of the second arm portion 48B of the torsion coil spring 48 which is bent in a substantially U-shape is inserted inside the mounting hole 46 formed at the side wall portion 12 of the housing 11 while widening a relative angle between the first arm portion 48A and the second arm portion 48B.

Thus, the clutch 111 is turned and biased by the torsion coil spring 48 so that the guiding pin 42 of the pawl 23 which is loosely fitted inside the guiding groove 142 comes in contact with the edge portion located at a position which is furthest away from the ratchet gear 35 in a rotational radial direction of the ratchet 111 (in FIG. 13, corresponds to a lower edge portion of the guiding groove 142) and enters a rotating posture, which makes it rotate and bias in a direction opposite the webbing-pull-out direction.

More specifically, when the clutch 111 is turned in the webbing-pull-out direction (counter-clockwise direction in FIG. 13), the torsion coil spring 48 acts as an urging member which turns and urges the clutch 111 in a webbing-take-up direction (clockwise direction in FIG. 13) so as to be placed in a standard rotating posture in normal state time as shown in FIG. 13. The urging effect is due to the rotation urging force acting in a webbing-take-up direction generated by the elastic coupling portion 48C in response to widening of the relative angle between the first arm portion 48A and the second arm portion 48C. The torsion coil spring 48 guides the pawl 23 in a direction away from the ratchet gear 35 via the guiding groove 142 of the clutch 111.

As shown in FIG. 14, in normal state, in the guiding groove 142, the guiding pin 42 of the pawl 23 comes in contact with an edge portion (corresponds to a lower edge portion of the guiding groove 142 in FIG. 12) located furthest away from the ratchet gear 35 in the radial direction of the clutch 111 to regulate rotation. Thus, the pawl 23 is held in a state wherein the side face thereof which is opposite the ratchet gear 35 either comes in contact with or is positioned in the vicinity of the boss 30C of the pressing member 30 as inserted inside the notch portion 38 defined in the side wall portion 12.

[Operation in Lock Mechanism]

Next, the operation of the lock mechanism 10 that locks rotation of the take-up drum unit 6 in the webbing pull-out direction will be described referring to FIG. 12 through FIG. 14. Here, the lock mechanism 10 operates as two types of lock mechanisms, including a "webbing-sensitive lock mechanism" which is activated in response to sudden pull-out of the webbing 3, and a "vehicle-body-sensitive lock mechanism" which is activated in response to acceleration caused by vehicle rocking or tilting. The "webbing-sensitive lock mechanism" and the "vehicle-body-sensitive lock mechanism" have a common operation with respect to the pawl 23.

[Description of Operation in Webbing-sensitive Lock Mechanism]

First, the locking operation of the "webbing-sensitive lock mechanism" will be described referring to FIG. 12 through FIG. 14. As illustrated in FIG. 12 through FIG. 14, the locking arm 108 is rotatably supported by the support boss 135 of the locking gear 107, so that when the acceleration to pull out the webbing 3 exceeds a predetermined acceleration (for instance, approximately 2.0 G, 1 G≈9.8 m/s$^2$), an inertial delay is generated in the locking arm 108 with respect to the rotation of the locking gear 107 in the webbing pull-out direction (counterclockwise direction in FIG. 13).

Thus, maintaining the initial position against the urging force of the sensor spring 109, the locking arm 108 abutting on the stopper 146 of the locking gear 107 rotates clockwise centering the support boss 135 with respect to the locking gear 107 up to the vicinity of the rotation restrictor 147. Accordingly, the engagement claw 145 of the locking arm 108 is rotated radially outward with respect to the rotational axis of the locking gear 107 to engage with the clutch gear 143 of the clutch 111.

When the webbing 3 continues to be pulled out at the acceleration exceeding the predetermined acceleration, the locking gear 107 further rotates in the webbing pull-out direction, so that the engagement claw 145 of the locking arm 108 is rotated in the webbing pull-out direction while being engaged with the clutch gear 143.

Accordingly, the clutch gear 143 is turned in a webbing-pull-out direction by the locking arm 108. As a result, the clutch 111 is rotated about the axial center of the rib 125 in the locking gear 107, more specifically in a webbing-pull-out direction about the axial center of the rotational axis portion 119 (corresponding to a counter-clockwise direction in FIG. 13) against a rotation urging force applied in a webbing-take-up direction by the torsion coil spring 48 having a front end portion of the first arm portion 48A mounted to the spring fixing pin 173. More specifically, the clutch 111 is turned about the axial center of the rotational axis portion 119 in a webbing-pull-out direction against a rotation urging force applied in a webbing-take-up direction by the elastic coupling portion 48C as generated in association with widening of the relative angle between the first arm portion 48A and the second arm portion 48B.

Thus, when the clutch 111 is turned in a webbing-pull-out direction, the guiding pin 42 of the pawl 23 is guided by the guiding groove 142 of the clutch 111 which causes the pawl 23 to rotate to the ratchet gear 35 side. The guiding pin 42 of the pawl 23 is further guided by the guiding groove 142 of the clutch 111 and the pawl 23 engages the ratchet gear 35. This locks rotation of the take-up drum unit 6 as well as pull-out of the webbing 3.

[Description of Operation in Vehicle-body-sensitive Lock Mechanism]

Next, the locking operation of the "vehicle-body-sensitive lock mechanism" will be described referring to FIG. 12 through FIG. 14. As illustrated in FIG. 12 through FIG. 14, a spherical inertia mass body 52 of the acceleration sensor 28 is placed on a bowl-like bottom face portion of the sensor holder 51. The spherical inertial mass body 52 moves on the bottom face portion of the sensor holder 51 to pivotally move the sensor lever 53 upward in vertical direction, if acceleration due to rocking or tilting of the vehicle body exceeds the predetermined acceleration value (for instance, approximately 2.0 G).

Thus, the lock claw 53A of the sensor lever 53 comes in contact with the receiving plate portion 148 of the pilot lever 112 which is rotatably attached to the mounting boss 163 formed at the extending portion 158 of the clutch 111, to rotate the pilot lever 112 upward in vertical direction. Accordingly, the pilot lever 112 is rotated clockwise around the axial center of the mounting boss 163, and the engagement claw portion 112A of the pilot lever 112 enters inside the opening portion 172 of the clutch 111, and is engaged with a locking gear tooth 107A formed at the outer peripheral portion of the locking gear 107. Here, a predetermined clearance (for instance, approximately 0.1 mm clearance) is formed between the upward rotation restrictor portion 165 and the pilot lever supporting block 171.

Then, when the webbing 3 is pulled out while the pilot lever 112 is engaged with the locking gear tooth 107A of the locking gear 107, the locking gear 107 is rotated in the webbing pull-out direction (counterclockwise direction in FIG. 13). Further, the rotation of the locking gear 107 in the webbing pull-out direction is transmitted to the clutch 111 through the pilot lever 112, the mounting boss 163 and the pilot lever supporting block 171.

As a result, when the locking gear 107 is turned in a webbing-pull-out direction, the clutch 111 is turned about the axial center of the rib 125 of the locking gear 107 against a rotation urging force applied in a webbing-take-up direction by the torsion coil spring 48 having a front end portion of the first arm portion 48A thereof mounted to the spring mounting pin 173. More specifically, the clutch 111 is turned about the axial center of the rotational axis portion 119 in a webbing-pull-out direction. In other words, the clutch 111 is turned in a webbing-pull-out direction about the axial center of the rotational axis center 119 against a rotation urging force as generated in response to widening of the relative angle between the first arm portion 48A and the second arm portion 48B and applied in a webbing-take-up direction by the elastic coupling portion 48C.

Thus, when the clutch 111 is turned in a webbing-pull-out direction, the guiding pin 42 of the pawl 23 is guided by the guiding groove 142 of the clutch 111 which causes the pawl 23 to rotate to the ratchet gear 35 side. Thus, the guiding pin 42 of the pawl 23 is further guided by the guiding grove 142 of the clutch 111 and the pawl 23 is engaged with the ratchet gear 35. Thus, rotation of the take-up drum unit 6 is locked, which locks pull-out of the webbing 3.

[Schematic Configuration of Pretensioner Unit]

Figure 16:
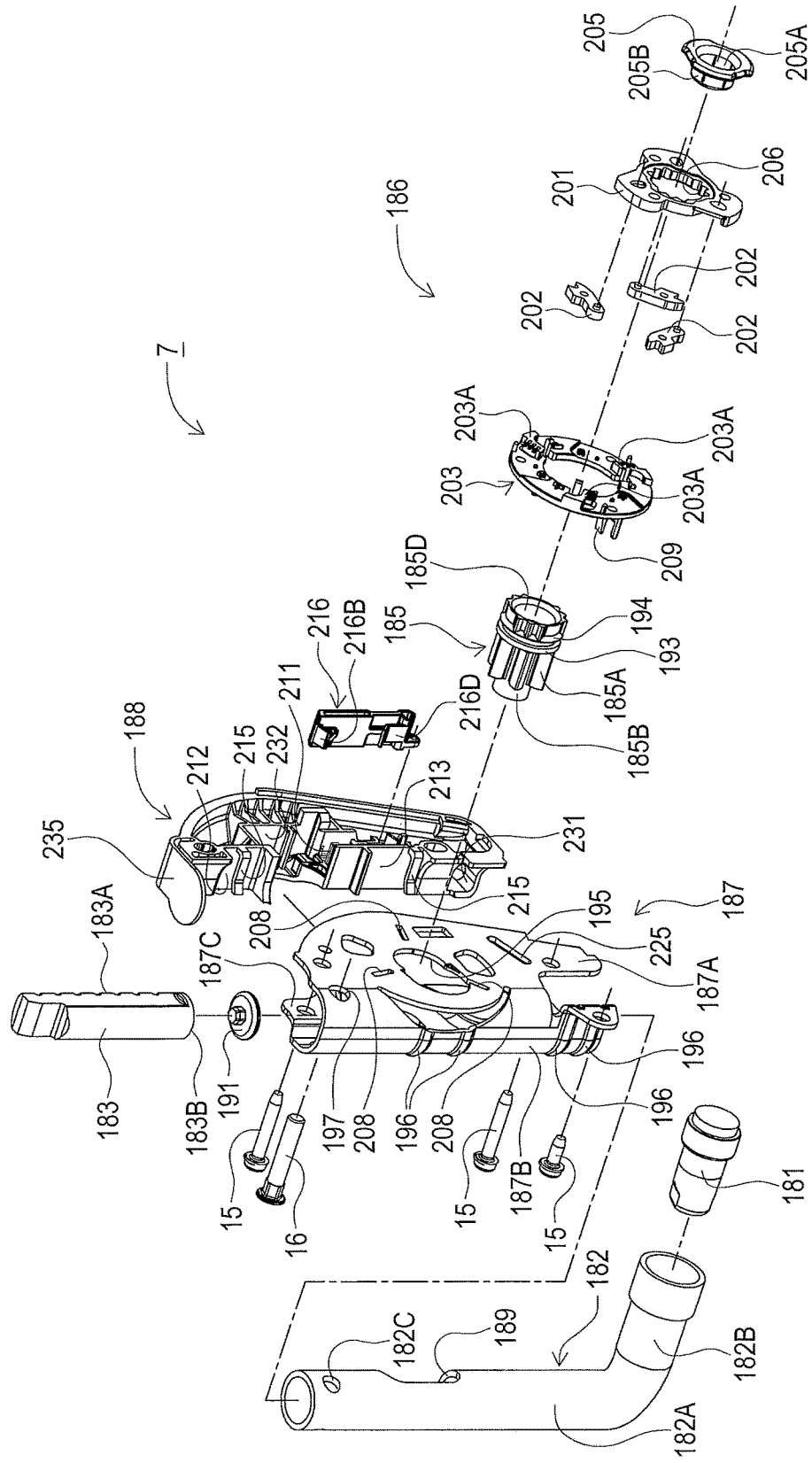
FIG. 16 is an exploded perspective view of a pretensioner unit.
Figure 17:
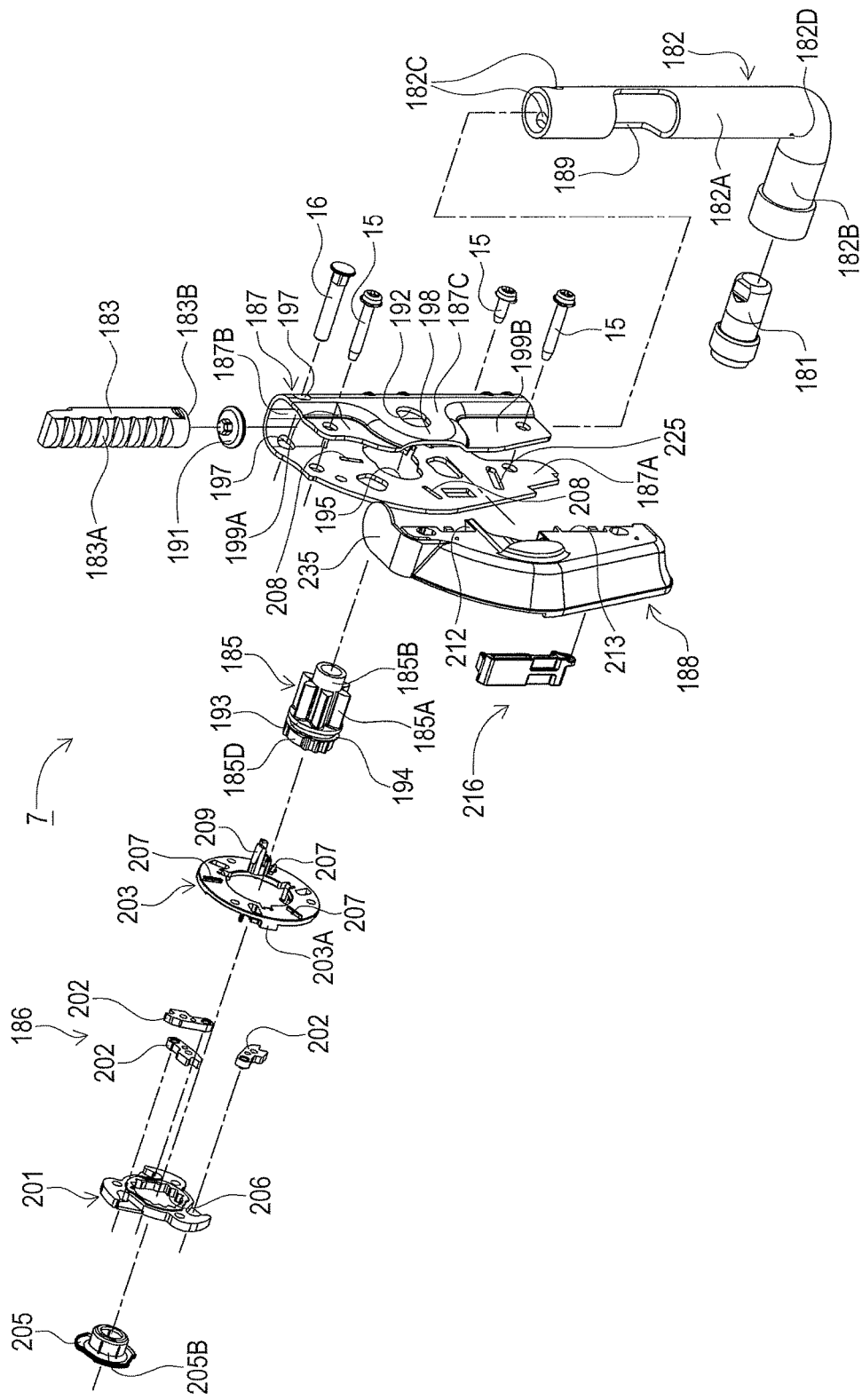
FIG. 17 is an exploded perspective view of a pretensioner unit.
Figure 18:
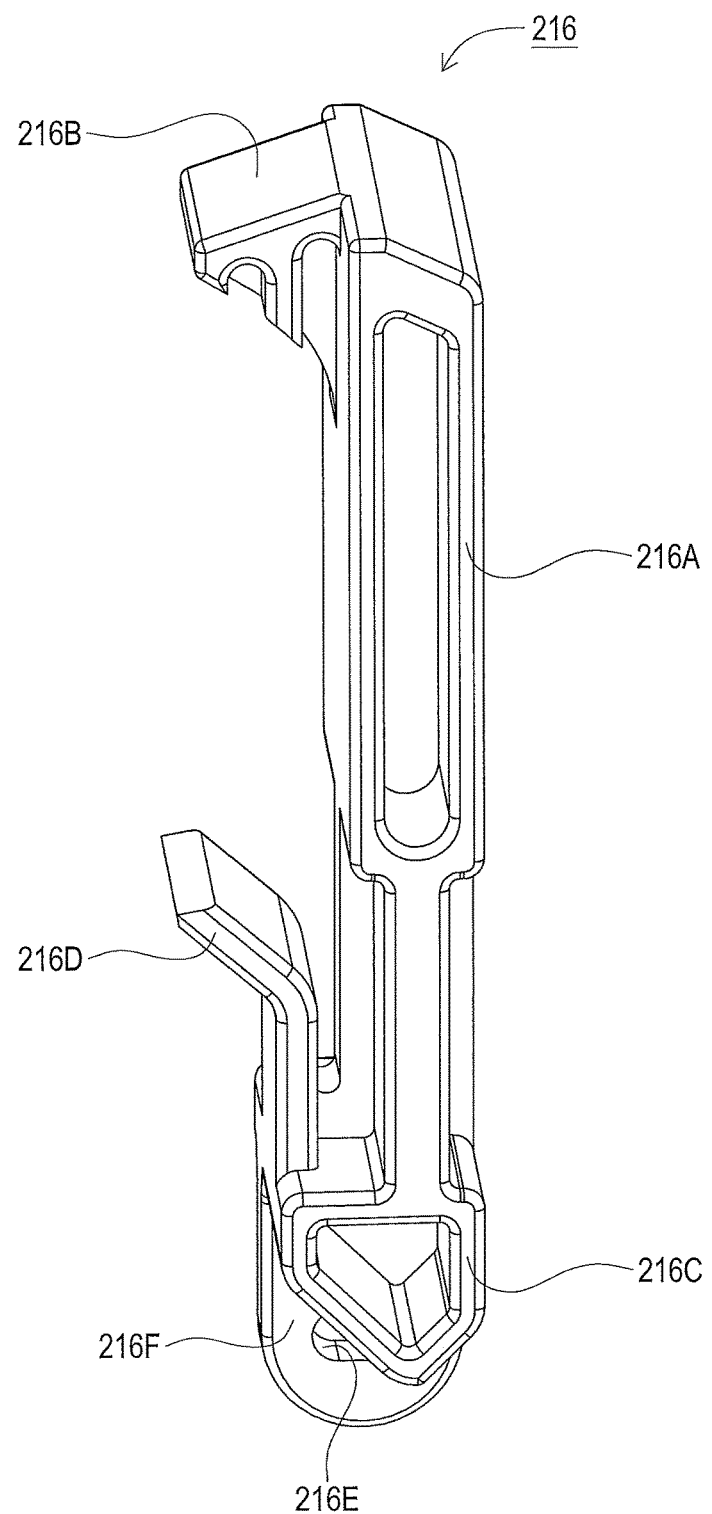
FIG. 18 is a perspective view showing a moving member.
Figure 19:
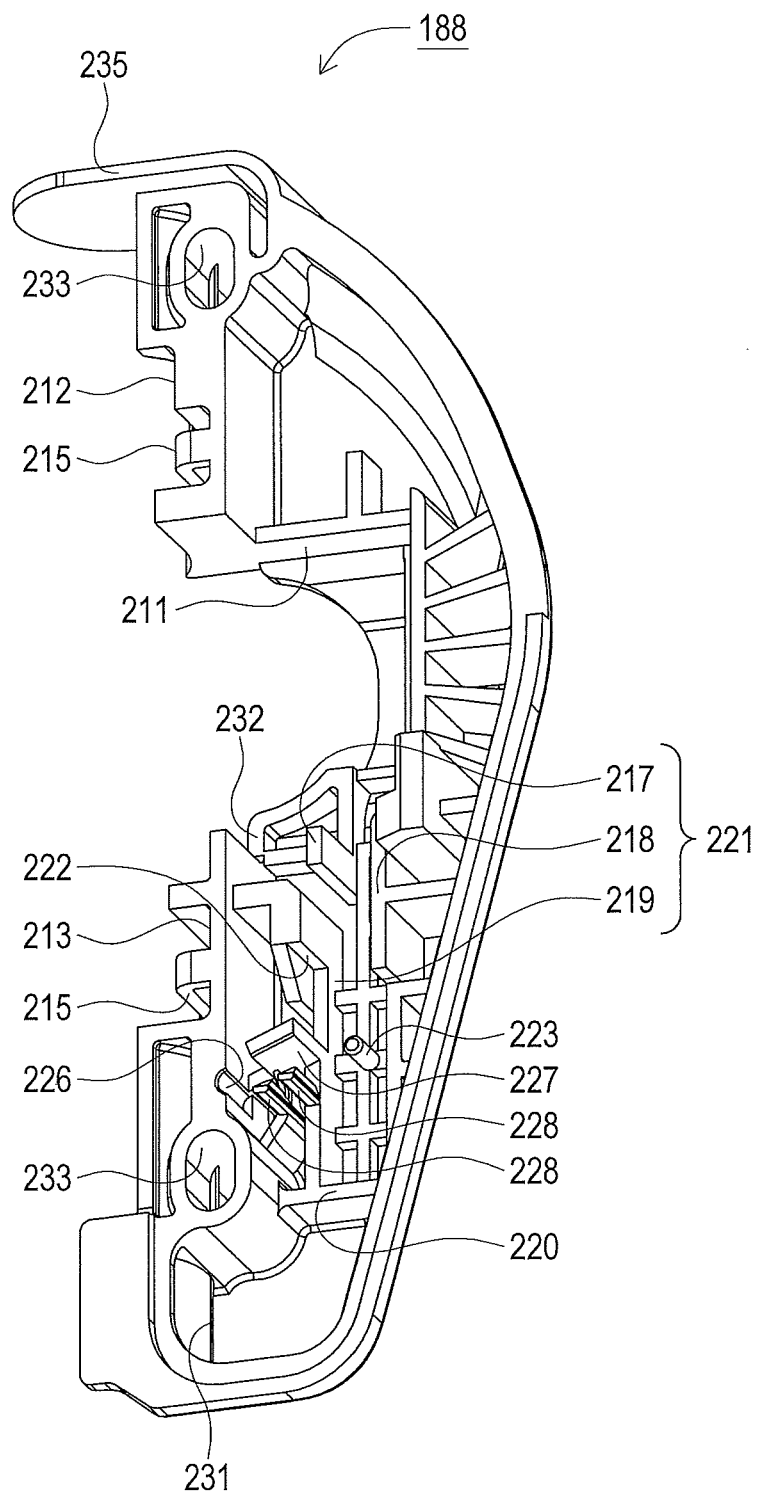
FIG. 19 is a perspective view of an inner side of a cover member.
Figure 20:
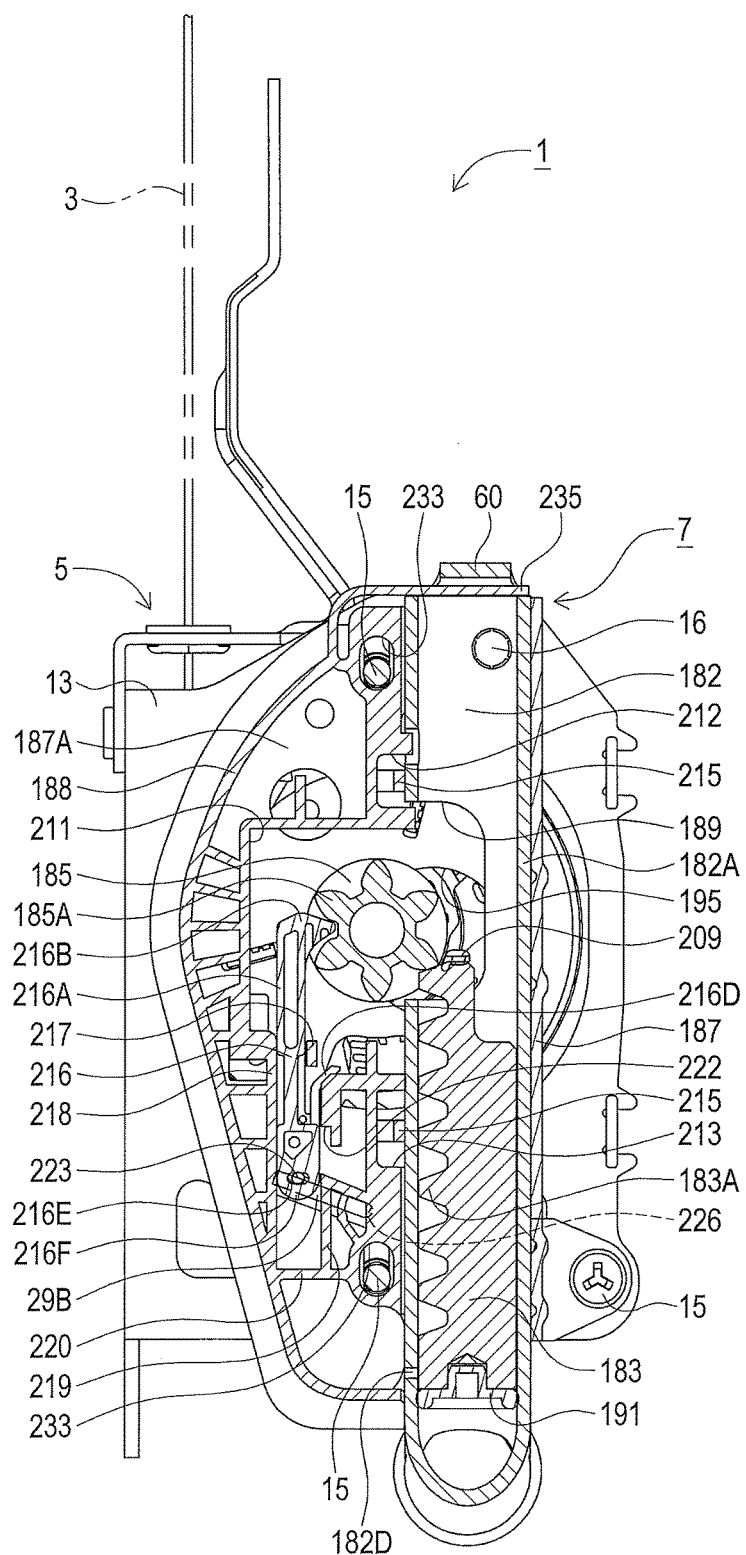
FIG. 20 is a view for illustrating an internal configuration of the pretensioner unit.
Figure 21:
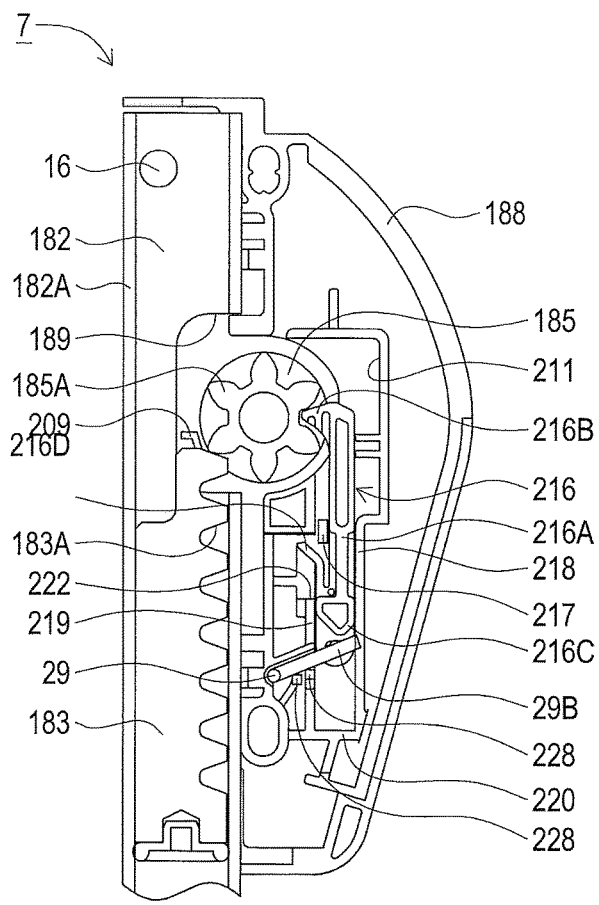
FIG. 21 is an explanatory diagram showing the pretensioner unit in normal condition.
Figure 22:
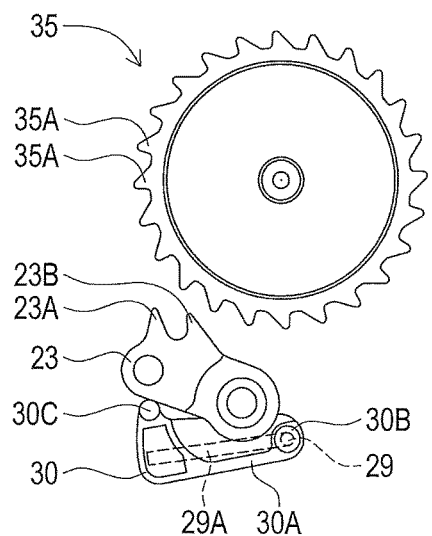
FIG. 22 is an explanatory diagram showing a pawl corresponding to FIG. 21 in normal condition.

Next, a schematic configuration of the pretensioner unit 7 will be described referring to FIG. 4, FIG. 5, FIG. 8 and FIG. 16 through FIG. 22. FIG. 16 and FIG. 17 is an exploded perspective view showing the pretensioner unit 7 in a disassembled state. FIG. 18 is a perspective view showing a moving member. FIG. 19 is a perspective view of an inner side of a cover member. FIG. 20 is a view for illustrating an internal configuration of the pretensioner unit. FIG. 21 is an explanatory diagram showing the pretensioner unit in normal condition. FIG. 22 is an explanatory diagram showing a pawl corresponding to FIG. 21 in normal condition.

The pretensioner unit 7 is configured to securely restrain a vehicle occupant, through rotating the take-up drum 65 in the webbing take-up direction to remove the slack of the webbing 3, in an emergency such as vehicle collision.

As illustrated in FIG. 4, FIG. 5, FIG.8 and FIG. 16 through FIG. 21, the pretensioner unit 7 is comprised of a gas generating member 181, a pipe cylinder 182, a piston 183, the pinion gear 185, a clutch mechanism 186, a holding plate 187 and a cover member 188.

This gas generating member 181 includes a gas generating agent such as explosive powder which is ignited in response to an ignition signal transmitted from a controller, which is not shown, generating gas as a result of combustion of the gas generating agent.

The pipe cylinder 182 is formed as a substantially L shaped cylindrical member, with a gas introducing portion 182B connected on one end of a linear piston guiding cylindrical portion 182A. The gas introducing portion 182B is configured to house the gas generating member 181. Accordingly, the gas generated at the gas generating member 181 is introduced inside the piston guiding cylindrical portion 182A from the gas introducing portion 182B. Further, an opening portion 189 is formed in the middle portion in longitudinal direction on one side portion of the piston guiding cylindrical portion 182A, and a portion of pinion gear teeth 185A of the pinion gear 185 is arranged therein.

The pipe cylinder 182 is inserted toward a back side of the holding plate 187 having a substantially U-shape in cross section from its lower side so that the pipe cylinder 182 is elastically held at the back side of the holding plate 187 by a base plate portion 187A to be fixed to the side wall portion 13 of the housing 11, a back plate portion 187B at the back side, having a semicircular arc shape in cross section, and a cover plate portion 187C at the outer side. The pipe cylinder 182 is fixedly attached on the outer surface of the side wall portion 13 by the screws 15 in a state of being pressed toward back side of the holding plate 187 by the cover member 188 which is inserted from an open side of the holding plate 187 and positioned near the pipe cylinder 182 at the back side of the holding plate 187.

Further, a pair of through holes 182C are formed on the upper end portion of the piston guiding cylindrical portion 182A, arranged facing each other. The stopper pin 16 is inserted into the pair of through holes 182C. The stopper pin 16 mounts the pretensioner unit 7 onto the side wall portion 13, and serves as a stopper for the piston 183, and also as a stopper and a rotation preventer for the pipe cylinder 182.

The piston 183 is made of metal such as steel material or the like and has an overall lengthy shape, with a substantially rectangular shape in cross section that enables insertion thereof from the top end portion of the piston guiding cylindrical portion 182A. On a side surface of the pinion gear 185 side of the piston 183, there is formed a rack 183A configured to engage with the pinion gear teeth 185A of the pinion gear 185. Further, the end surface of the gas generating member 181 side of the piston 183 is formed into a circular end surface 183B corresponding to the cross sectional shape of the piston guiding cylindrical portion 182A. A sealing plate 191 formed of a rubber material or the like is attached on the circular end surface 183B.

Before activation of the pretensioner unit 7, namely in a normal waiting state in which the gas is not generated by the gas generating member 181, the piston 183 is inserted toward a back side of the piston guiding cylindrical portion 182A and settled at a position which makes the rack 183A disengage from the pinion gear teeth 185A. At the back side end portion of the piston guiding cylindrical portion 182A, a gas releasing hole 182D is formed so as to face the bottom end portion of the cover member 188, the gas releasing hole 182D in a normal state being sealed by a gas generating member 181 side outer end surface portion of the piston 183.

The pinion gear 185 is a columnar member made of a steel material or the like. The pinion gear 185 is provided with the pinion gear teeth 185A on an outer peripheral portion thereof engageable with the rack 183A. The pinion gear 185 also has a support portion 185B formed in a cylindrical shape, extending outward from the cover plate portion 187C side end of the pinion gear teeth 185A with reference to rotation axis direction. The support portion 185B has outer diameter the same as diameter of a circle consisting of tooth bottom of the pinion gear teeth 185A so that the support portion 185B is rotatably fitted into an outer shaft receiving hole 192 formed in a substantially center part of the cover plate portion 187C. The support portion 185B has length to slightly project outward from the outer shaft receiving hole 192 when fitted into the outer shaft receiving hole 192.

At a base plate portion 187A side end portion of the pinion gear teeth 185A with reference to the axis center direction thereof, there is formed a flange portion 193 in a flange-like shape having outer diameter slightly larger than tooth tip diameter of the pinion gear teeth 185A. A boss portion 185D is formed so as to project from the flange portion 193 toward the take-up drum unit 6 with reference to the axis center direction thereof, the boss portion 185D having a substantially cylindrical shape of which outer diameter is slightly smaller than outer diameter of the flange portion 193. The boss portion 185D and the flange portion 193 form a step having a predetermined height (height roughly the same as plate thickness of the base plate portion 187A, for instance).

At the base end portion of the boss portion 185D, there is provided a flange portion 194 in a flange-like shape having outer diameter roughly the same as that of the flange portion 193 extending radially outward along entire outer peripheral surface of the boss portion 185D so as to form a clearance roughly the same as plate thickness of the base plate portion 187A with reference to the flange portion 193. On the take-up drum unit 6 side outer peripheral surface of the boss portion 185D over the flange portion 194 with reference to the axis center of the take-up drum unit 6, three sets of three splines are formed thereon at equal center angle of 120 degrees. The sets of three splines form outer diameter slightly smaller than outer diameter of the flange portion 194.

As illustrated in FIG. 16 and FIG. 17, of the holding plate 187 substantially U-shaped in cross section, the long-plate-shaped base plate portion 187A has a substantially round shaped area at longitudinal center portion thereof so as to almost cover the flange portion 68 of the take-up drum 65. At the longitudinal center portion of the base plate portion 187A, there is formed an inner shaft receiving hole 195 which allows insertion of the pinion gear teeth 185A on the pinion gear 185 and the flange portion 193.

As illustrated in FIG. 16 and FIG. 17, the back plate portion 187B having a substantially U-shape in cross section is formed so as to continuously extend from the base plate portion 187A side edge portion. Further, the back plate portion 187B has side surface portions facing each other. At the upper parts of the side surface portions at which a pair of through holes 182C of the pipe cylinder 182 are positioned, there are formed a pair of through holes 197 so as to allow insertion of the stopper pin 16 via the pair of through holes 182C.

The cover plate portion 187C is formed so as to continuously extend from a side edge portion, outside in the rotational axis direction of the take-up drum 6, of the back plate portion 187B and present in parallel with the base plate portion 187A. The cover plate portion 187C has a long rectangular shape in front view and width roughly the same as width at the upper and lower end portions of the base plate portion 187A. In the center part of the cover plate portion 187C, there is formed an outer shaft receiving hole 192 so as to allow insertion of the support portion 185B of the pinion gear 185.

As illustrated in FIG. 16 and FIG. 17, the clutch mechanism 186 includes: a pawl base 201 made of a steel material or the like; three clutch pawls 202 made of a steel material or the like; a substantially ring-like pawl guide 203 made of a synthetic resin such as polyacetal and made to abut on the base plate portion 187A side of the pawl base 201; and a substantially ring-like bearing 205 made of a synthetic resin such as polyacetal, made to abut on the take-up drum 65 side of the pawl base 201 and press-fitted in the boss portion 185D of the pinion gear 185.

A center portion of the pawl base 201 has an engaging hole 206 having three sets of three spline grooves at center angle of approximately 120 degrees so that spline is press-fitted for fitting of the boss portion 185D of the pinion gear 185. Regarding the pinion gear 185 inserted between the outer shaft receiving hole 192 and the inner shaft receiving hole 195 of the holding plate 187, the boss portion 185D projecting from the inner shaft receiving hole 195 is press-fitted in the engaging hole 206 of the pawl base 201 holding the pawl guide 203 and three clutch pawls 202 therebetween. Thereby, the pawl base 201 is attached in a relatively non-rotatable manner with reference to the pinion gear 185. That is, the pawl base 201 and the pinion gear 185 are configured to rotate integrally.

At the center part of the bearing 205, there is formed a through hole 205A having inner diameter which is roughly the same as outer diameter of the boss 72 of the take-up drum 65. Further, a cylindrical-shaped shaft receiving portion 205B is formed so as continuously project from the pawl base 201 side peripheral edge portion of the through hole 205A, the shaft receiving portion 205B having inner diameter roughly the same as inner diameter of the through hole 205A and having outer diameter roughly the same as inner diameter of the boss portion 185D of the pinion gear 185.

The cylindrical shaped shaft receiving portion 205B arranged upright on the center part of the bearing 205 is press-fitted in the cylindrical shaped boss portion 185D in a state that the boss portion 185D of the pinion gear 185 is press-fitted in the engaging hole 206 of the pawl base 201. Thereby, the bearing 205 made of a synthetic material such as polyacetal or the like is attached.

As illustrated in FIG. 8, in the bearing 205, there is rotatably press-fitted the boss 72 arranged upright on the pretensioner unit 7 side end surface portion of the take-up drum 65. Each of the clutch pawls 202 is supported in an accommodated position on the pawl base 201. The accommodated position is a position in which the entire clutch pawls 202 are accommodated within the outer peripheral portion of the pawl base 201.

As illustrated in FIG. 16 and FIG. 17, the pawl guide 203 is a substantially ring-like member, and arranged at a position facing the pawl base 201 and each clutch pawl 202. On the base plate portion 187A side of the pawl guide 203, three long positioning projections 207 are arranged along radial direction at center angle of roughly 120 degrees. The positioning projections 207 are respectively inserted in positioning holes 208 formed at the peripheral portion of the inner shaft receiving hole 195 formed in the base plate portion 187A. In a waiting state, the pawl guide 203 is fixed to the base plate 187A in a non-rotatable manner.

Thereby, the clutch mechanism 186 and the pinion gear 185 are fixedly mounted on the base plate portion 187A while the pinion gear teeth 185A of the pinion gear 185 is always set at the position illustrated in FIG. 20 and fixed thereat. Further, a long thin plate-like piston positioning pin 209 is arranged upright on the base plate portion 187A side of the pawl guide 207. The piston positioning pin 209 is inserted in the inner shaft receiving hole 195 and made to abut on an upper end surface of the piston 183, the end portion to which the piston 183 moves.

As shown in FIG. 8 and FIG. 20, when the pawl guide 203 is fixed to the base plate portion 187A in a non-rotatable manner, rotation axis of the pinion gear 185 coincides with that of the take-up drum unit 6. At the same time, the outer peripheral surface of the support portion 185B of the pinion gear 185 is made to abut on the outer shaft receiving hole 192 in the cover plate portion 187C and the outer peripheral surface of the boss portion 185D is made to abut on the inner shaft receiving hole 195 in the base plate portion 187A so as to rotatably support the pinion gear 185. Further, a part of the pinion gear teeth 185A is arranged so as to present in the opening portion 189 of the piston guiding cylindrical portion 182A and made to abut on an upper end surface of the piston 183, the end portion to which the piston 183 moves.

On a surface on the pawl base 201 side of the pawl guide 203, position changing projecting portions 203A are projecting so as to correspond to clutch pawls 202, respectively. When the pawl base 201 and the pawl guide 203 are relatively rotated in response to activation of the pretensioner unit 7, the clutch pawls 202 respectively make contact with the position changing projecting portions 203A, so that the position is changed from an accommodated position to a locking position. The locking position is a position in which the tip portions of the clutch pawls 202 project outward of the outer peripheral end portion of the pawl base 201 and the pawl guide 203.

Further, when the position of the clutch pawls 202 is changed to the locking position, the clutch pawls 202 are engaged with the take-up drum 65. Specifically, when the clutch pawls 202 project to the outside of the outer peripheral end portion of the pawl base 201 and the pawl guide 203, the clutch pawls 202 are engageable with the internal gear 69 formed on the inner peripheral surface of the flange portion 68 of the take-up drum 65.

Then, when the clutch pawls 202 change position to the locking position, the tip portion of each clutch pawl 202 engages with the internal gear 69, so that the pawl base 201 rotates the take-up drum 65. Incidentally, the engagement of the clutch pawl 202 and the internal gear 69 has an engagement structure that allows the take-up drum 65 to rotate in one direction alone, namely, in a take-up direction of the webbing 3.

Further, once engaged, the clutch pawls 202 each catch the internal gear 69 with deformation, so that when the take-up drum 65 rotates in the webbing pull-out direction following engagement, the pinion gear 185 is rotated in a direction opposite to the activation of the pretensioner unit 7 through the clutch mechanism 186, and the piston 183 is pushed back in the direction opposite to the activation direction. When the piston 183 is pushed back up to a position to release the engagement between the rack 183A of the piston 183 and the pinion gear teeth 185A of the pinion gear 185, the pinion gear 185 is released from the piston 183, so as to allow the take-up drum 65 to freely rotate with respect to the piston 183.

As shown in FIG. 8, and FIG. 16 through FIG. 20, the cover member 188 is made of a synthetic resin such as polyacetal or the like. The cover member 188 is formed in a substantially long box-like shape in longitudinal direction and is arranged to face the piston guiding cylinder portion 182A of the pipe cylinder 182 across substantially its entire length and is fitted inside between the base plate portion 187A and the cover plate portion 187C of the holding plate 187. The side face portion of the cover member 188 on the base plate portion 187A side is open and the side face portion thereof on the base plate portion 187A side is entirely covered by the base plate portion 187A.

The substantially center portion of the cover member 188 in a vertical direction thereof opposite the pinion gear 185 is formed to have substantially the same thickness as the width of the pinion gear teeth 185A in a rotational axis direction and is provided with a gear housing portion 211 formed so as to have a substantially U-shaped depression in side view inwardly with respect to the pipe cylinder 182 at a larger depth and vertical height than an outer diameter of the pinion gear teeth 185A. The bottom face portion of the gear housing portion 211 facing the cover plate portion 187C is notched out in a semicircular shape with a slightly larger inner diameter than the outer diameter of the pinion gear teeth 185A.

A moving member 216 having a substantially long thin plate-like shape is arranged at a lower side portion from the gear housing portion 211 inside the cover member 188, in a longitudinal direction of the cover member 188, more specifically so as to face the piston guiding cylindrical portion 182A in a movable fashion with respect to a vertical direction in FIG. 16 and FIG. 20. As shown in FIG. 18 and FIG. 20, the moving member 216 is made of a synthetic resin such as polyacetal or the like. The moving member 216 is constituted of a main body portion 216A, a projecting portion 216B and a contact portion 216C. The main body portion 216A has a substantially long thin plate-like shape. The projection portion 216B projects from the upper end portion of the main body 216A to the pinion gear 185 side and has a substantially triangular shape in cross section, being capable of engaging with the pinion gear teeth 185A. The contact portion 216C has a substantially pentagonal shape and is formed so as to protrude from the lower end portion of the main body 216A across its entire width towards the piston guiding cylindrical portion 182A side and downward at a larger width than the width of the main body portion 216A.

Furthermore, the moving member 216 has an engagement piece 216D which is elastically deformable inward with respect to the main body portion 216A. The engagement piece 216D extends by a predetermined length parallel with respect to the main body portion 216A in an upward direction from the upper side end portion of the contact portion 216C on the pinion gear side 185 and further extends obliquely outwardly on the pinion gear 185 side. Also, the moving member 216 has a positioning portion 216F extending downward in a substantially semi-disk shape from an edge portion of the contact portion 216C on the opposite side with respect to the base plate portion 187A, in other words, from an edge portion from the back side in FIG. 18 by a predetermined thickness, for instance approximately 2 mm across the overall width thereof. The positioning portion 216F has a positioning hole 216E formed at a center portion thereof in a substantially longitudinally long rectangular shape in a width direction of the main body portion 216A.

As shown in FIG. 19 and FIG. 20, a vertically short guide rib 217 and a vertically long guide rib 218 are provided at a lower side of the gear housing portion 211 inside the cover member 188. The guide rib 217 and the guide rib 218 are installed to extend from a bottom face portion of the pinion gear 185 on the outer side in a rotational axis direction and face each other at a distance approximately equal to the width of the main body portion 216A of the moving member 216. A guide rib 219 is installed slightly lower than the guide rib 217 so as to face the guide rib 218 at a distance substantially equal to the width of the positioning portion 216F of the moving member 216, in other words, the width of the contact portion 216C. A guide portion 221 which guides movement of the moving member 216 in a vertical direction is made up of the respective guide ribs 217, 218 and 219.

An engagement portion 222 is formed slightly lower for instance approximately 5 mm lower from an upper edge surface of the guide rib 219 on the gear housing portion 211 side and has a step-wise depression formed at a depth of approximately 1.5 mm, for instance, so as to allow the tip end of a engagement piece 216D of the moving member 216 to engage therewith. A positioning pin 223 fitted inside a positioning hole 216E of the moving member 216 is installed at a substantially center portion in a vertical direction between the guide rib 218 and the guide rib 219.

Accordingly, as shown in FIG. 20, the main body portion 216A of the moving member 216 is fitted between the respective guide ribs 217 and 218, and furthermore the main body portion 216A and the engagement piece 216D are fitted between the respective guide ribs 218 and 219, and the positioning pin 223 is fitted in the positioning hole 216E of the positioning portion 216F. As a result, the moving member 216 is held by the guide portion 221 of the cover member 188 and is positioned at its normal position. The projecting portion 216B of the moving member 216 engages the pinion gear teeth 185A and is positioned either so as to come in contact with the pinion gear teeth 185A or in the vicinity of the pinion gear teeth 185A. Preferably, the projecting portion 216B of the moving member 216 is positioned so as to engage the pinion gear teeth 185A and come in contact with the pinion gear teeth 185A.

As shown in FIG. 8, FIG. 16 and FIG. 17, an oblong hole-like insertion hole 225 into which the arm portion 29B of the coupling member 29 is inserted is formed at a position in the base plate portion 187A of the holding plate 187 which faces the supporting groove 57A of the side wall portion 13. When the holding plate 187 is mounted on the side wall portion 13, the outer peripheral portion of the insertion hole 225 overlaps the supporting groove 57A so as to cover the through hole 57 side of the supporting groove 57A. Thus, movement of the linear portion 29C of the coupling member 29 towards the through hole 57 side is restrict by the coupling member 29 is rotatably supported deep in the substantially V-shaped supporting groove 57A (refer to FIG. 8).

As shown in FIG. 19 and FIG. 20, an insertion groove 226 having a semicircular shape in cross section is formed parallel with respect to a rotational axis direction of the pinion gear 185. The insertion groove 226 is formed below the engagement portion 222 of the cover member 188 and is adapted for insertion of a bottom end portion of the arm portion 29B and the linear portion 29C of the coupling member 29 projecting from the insertion hole 225 of the base plate portion 187A.

The depth side end face of the insertion groove 226 is formed so as to be slightly taller, for example, by approximately 0.5 mm~2 mm taller than the front end portion of the positioning pin 223. This depth side end face is installed so that the wide supporting rib 227 and the neighboring pair of long and narrow supporting ribs 228 face each other at an interval approximately equivalent with the diameter of the arm portion 29B of the coupling member 29 from the insertion groove 226 along a side direction of the positioning pin 223.

Accordingly, as shown in FIG. 20 and FIG. 21, the bottom end portion of the arm portion 29B and the linear portion 29C of the coupling member 29 protruding from the through hole 225 of the base plate portion 187A is fitted inside the insertion groove 226 and at the same time, the arm portion 29B is fitted between the supporting rib 227 and the respective supporting ribs 228. As a result, the front end portion of the arm portion 29B is installed so as to either come in contact with or be positioned in the vicinity of the lower end face of the contact portion 216C of the moving member 216 which is in its normal position, with the arm portion 29B being held in an initial rotating position by the respective supporting ribs 227 and 228.

Also, as shown in FIG. 22, the pressing member 30 coupled with the bent portion 29A of the coupling member 29 is installed so as to position the boss 30C either in contact with or in the vicinity of a side face of the pawl 23 which is in its normal position which is on the opposite side with respect to the ratchet gear 35. Preferably, the pressing member 30 is arranged so that the boss 30C comes in contact with a side face of the pawl 23 which is in its normal position and which is on the opposite side with respect to the ratchet gear 35 and also, the front end portion of the arm portion 29B comes in contact with a lower end face of the contact portion 216C of the moving member 216 which is in its normal position.

Also, as shown in FIG. 16, FIG. 19 and FIG. 20, a substantially rectangular through hole 231 in front view is formed in a lower end face of the side face portion of the cover member 188 on the pipe cylinder 182 side. Furthermore, a notch portion 232 of a predetermined width is formed in the side edge portion of the gear housing portion 211 on the base plate portion 187A side. Also, a gas releasing hole 182D formed at a lower end portion of the piston guiding cylindrical portion 182A and a through hole 187 formed in the lower end portion of the cover member 188 are arranged so as to relatively face each other and the gas releasing hole 182D communicates with an opening portion defined by the notch portion 232 formed in the gear housing portion 211 and the base plate portion 187A via the through hole 231. Then, the cover member 188 is mounted and secured to the outer side face of the side wall portion 13 by the respective screws 15 fitted inside through holes 233 defined along a thickness direction in a upper side of a concave portion 212 and a lower side of a concave portion 213, while being sandwiched by the holding plate 187.

As shown in FIG. 16, FIG. 17, FIG. 19 and FIG. 20, the cover member 188 has a flat portion 235 which is substantially U-shaped in plan view. The flat portion 235 extends from a top portion of the cover member 188 towards the pipe cylinder 182 side by a predetermined length equal to the thickness of the cover member 188 so as to cover the front end portion of the pipe cylinder 182 across its entire surface. Accordingly, in case the cover member 188 is arranged so as to be fitted in from the opening side of the holding plate 187 towards the pipe cylinder 182 on the deep side, the front end portion of the piston guiding cylindrical portion 182A is covered for the most part by the flat portion 235 as shown in FIG. 20. Then, in case it is mounted and secured to the outer side face of the side wall portion 13 by the respective screws 15 with the cover member 188 and pipe cylinder 182 being sandwiched by the holding plate 187, the extending portion 60 which extends from the top edge portion of the side wall portion 13 towards an outer side thereof is positioned directly above the front end portion of the piston guiding cylindrical portion 182A and the flat portion 235.

Next, the operation of the pretensioner unit 7 having the above-described configuration as well as its webbing 3 take-up operation in case of vehicle collision will be described while referring to FIG. 21 through FIG. 34.

Figure 23:
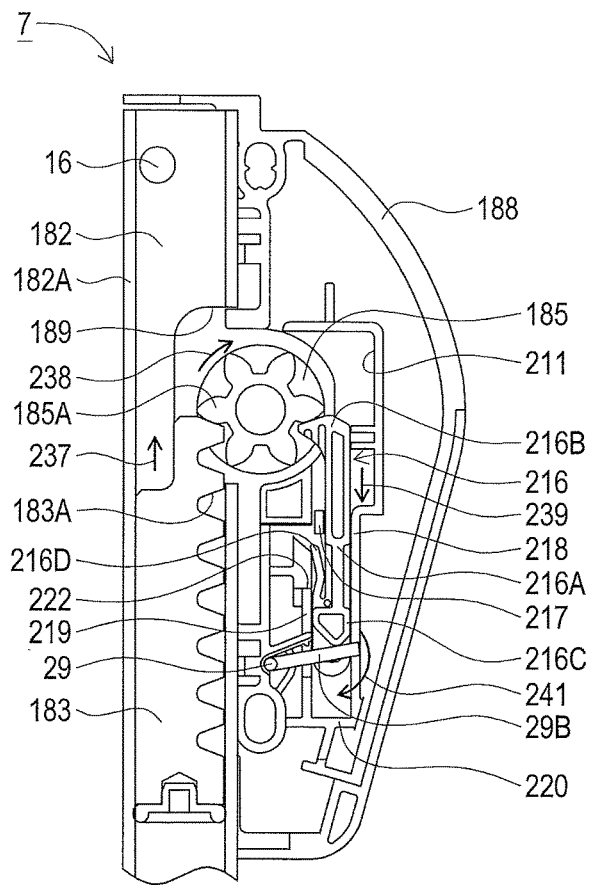
FIG. 23 is an explanatory diagram showing a condition wherein the pretensioner unit is actuated and causes the moving member to move.
Figure 25:
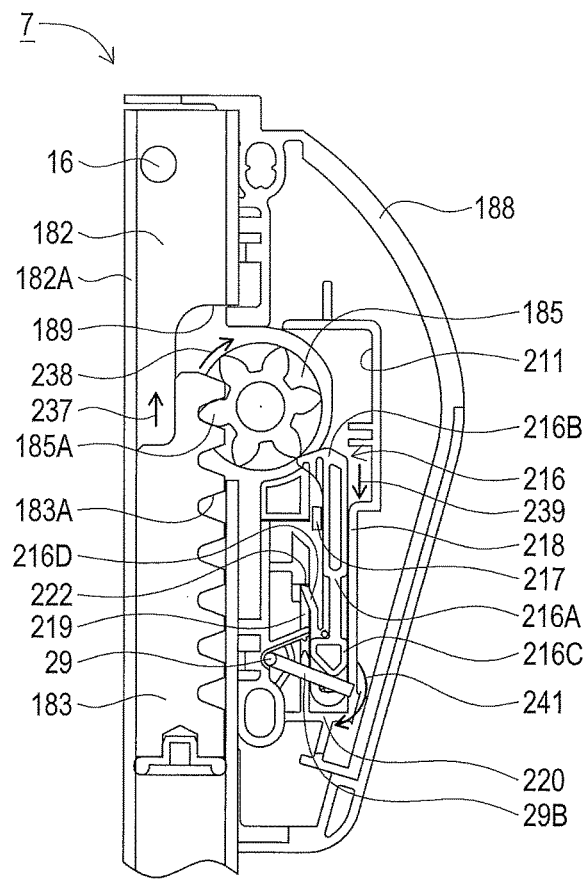
FIG. 25 is an explanatory diagram showing a condition wherein the pretensioner unit is further actuated and finish pressing the moving member.

As shown in FIG. 21, FIG. 23 and FIG. 25, when the gas generating member 181 of the pretensioner unit 7 is actuated in case of vehicle collision, the piston 183 breaks the piston positioning pin 209 under the pressure of the gas thus generated and moves towards a top end side of the piston guiding cylindrical portion 182A (corresponding to the direction of arrow 237), and the pinion gear 185 having the pinion gear teeth 185A which are engaged with the rack 183A starts turning (corresponding to the direction of arrow 238).

As the pinion gear 185 rotates, the moving member 216 having the projecting portion 216B engaged with the pinion gear teeth 185A is pressed downwards (corresponding to the direction of arrow 239). As a result, the moving member 216 breaks the positioning pin 223 engaged with the positioning hole 216E and lineally moves the main body portion 216A, the contact portion 216C and the positioning portion 216F in a downward direction while being guided by the respective guiding ribs 217 through 219. The projecting portion 216B of the moving member 216 is pressed so as to be positioned at an outer side in a radial direction from an addendum circle of the pinion gear teeth 185A.

As a result, the engagement piece 216D of the moving member 216 is elastically deformed inwardly with respect to the main body portion 216A to move to the guide rib 219 side. Then, the front end portion of the engagement piece 216D enters inside the engagement portion 222 formed slightly lower from the top end face of the guiding rib 219 on the gear housing portion 211 side. The bottom end face of the contact portion 216C in the moving member 216 presses the front end portion of the arm portion 29B to break the respective supporting ribs 228, causing the arm portion 29B to rotate downwards with the linear portion 29C of the coupling member 29 at an axial center (corresponding to the direction of arrow 241).

Figure 24:
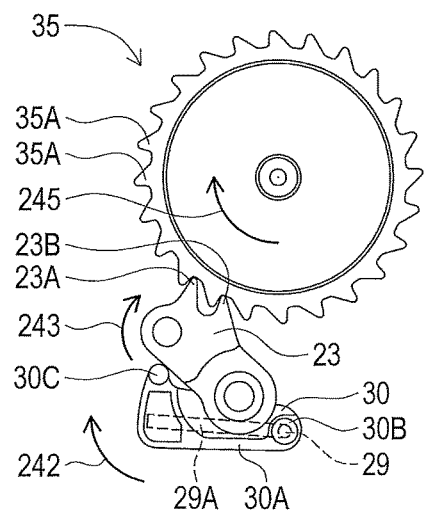
FIG. 24 is an explanatory diagram showing the condition of the pawl corresponding to FIG. 23.

As a result, rotation of the arm portion 29B as shown in FIG. 21 and FIG. 23 causes the pressing member 30 coupled to the bent portion 29A of the coupling member 29 to turn towards the ratchet gear 35 side (corresponding to the direction of arrow 242) with the boss 30B at the center, as shown in FIG. 22 and FIG. 24. Thus, the pressing member 30 causes the pawl 23 to rotate towards the ratchet gear 35 side via the boss 30C (corresponding to the direction of arrow 243), causing the respective engagement teeth 23A and 23B to engage the ratchet gear teeth 35A of the ratchet gear 35 as shown in FIG. 24.

Then, as the moving member 216 continues to travel downwards, it causes the arm portion 29B to further rotate as shown in FIG. 25. At this time, as the pressing member 30 which is coupled to the bent portion 29A of the coupling member 29 has already caused the pawl 23 to turn into a position for engagement with the ratchet gear teeth 35A of the ratchet gear 35, the linear portion 29C (coupling portion) of the coupling member 29 is elastically twisted and deformed in a circumferential direction.

As shown in FIG. 21, FIG. 23 and FIG. 25, when the pinion gear 185 turns, the pawl base 201 turns together with the pinion gear 185. At this time, respective positioning projections 207 is fitted in the respective positioning holes 208 formed at a marginal portion of an inner shaft hole 195 of the base plate portion 187A and causes a relative rotation of the pawl base 201 with respect to the pawl guide 203. Thus, the respective clutch pawls 202 come in contact with the respective position changing projecting portions 203A formed in the pawl guide 203 and the respective clutch pawl 202 switches to a locking position. Then, the respective clutch pawls 202 press the respective position changing projecting portions 203A from this condition, causing the respective positioning projections 207 of the pawl guide 203 to break, and the pawl guide 203 starts rotating integrally with the pawl base 201.

Figure 26:
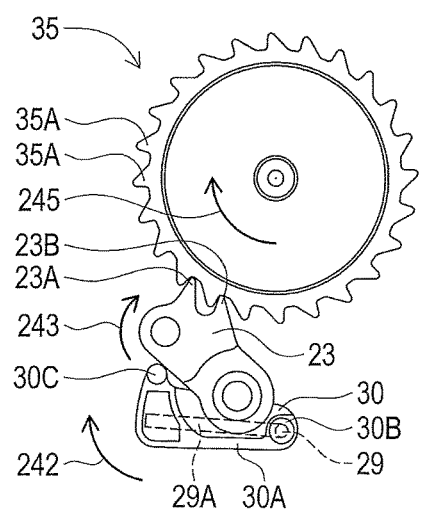
FIG. 26 is an explanatory diagram showing a condition of the pawl corresponding to FIG. 25.

Thus, the front end portion of the respective clutch pawls 202 engages with the internal gear 69 of the take-up drum 65, and the force with which the piston 183 tries to travel to the tip end side of the piston guiding cylindrical portion 182A is transferred to the take-up drum 65 via the pinion gear 185, the pawl base 201, the respective clutch pawls 202 and the inner gear 69. As shown in FIG. 24 and FIG. 26, the take-up drum 65 and the ratchet gear 35 are driven to rotate integrally in a webbing-take-up direction (corresponding to the direction of arrow 245), and the webbing 3 is wound onto the take-up drum 65.

The pawl 23 and the ratchet gear teeth 35A of the ratchet gear 35 are designed to have a shape that allows them to engage so as to suppress rotation of the take-up drum unit 6 in a pull-out direction of webbing 3 and allow rotation thereof in a take-up direction of webbing 3. Accordingly, when the pretensioner unit 7 is actuated, the take-up drum 65 rotates smoothly towards a webbing-take-up direction even if the respective engagement teeth 23A and 23B of the pawl 23 come in contact with the ratchet gear teeth 35A of the ratchet gear 35 rotating in a webbing-take-up direction.

Figure 27:
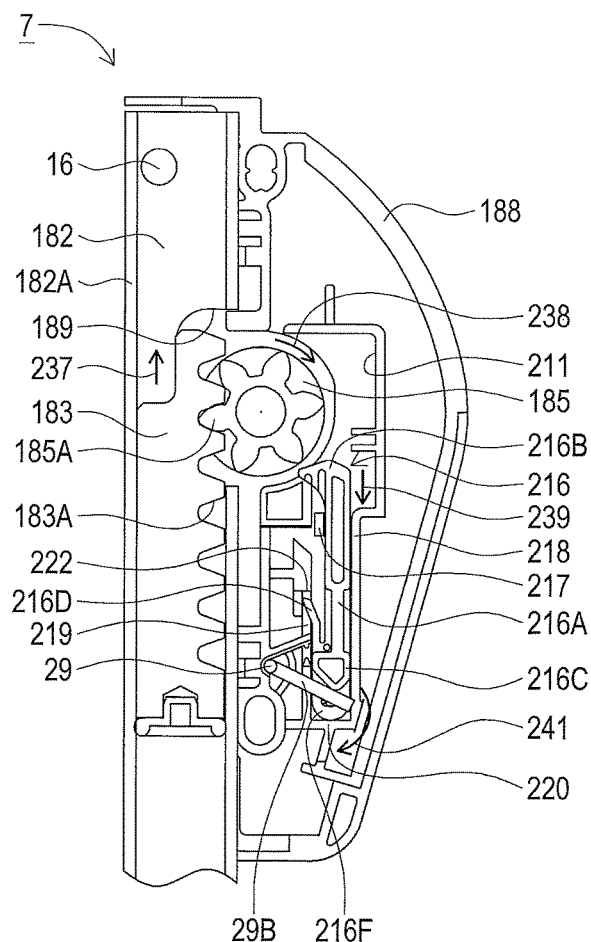
FIG. 27 is an explanatory diagram showing a condition wherein the pretensioner unit is further actuated and the moving member has moved due to inertia.

Next, as shown in FIG. 27, the moving member 216 linearly travels further downwards (corresponding to the direction of arrow 239), with the front end portion of the engagement piece 216D being fitted inside the engagement portion 222, until the positioning portion 216F comes in contact with a stop rib 220 provided across the guiding rib 218 and the guiding rib 219 under the inertia applied to the pinion gear teeth 185A. The bottom end face of the contact portion 216C in the moving member 216 presses the front end portion of the arm portion 29B and causes the arm portion 29B to rotate further downwards with the linear portion 29C of the coupling member 29 at an axial center (corresponding to the direction of arrow 241).

Figure 28:
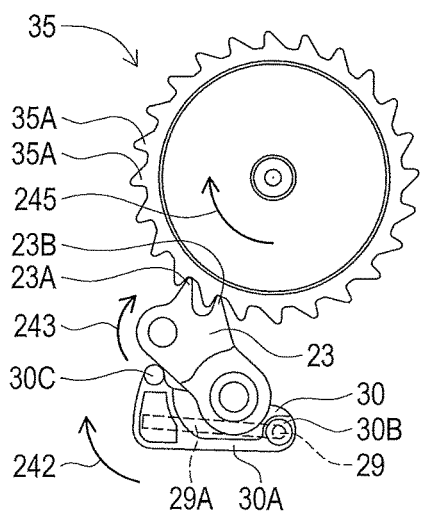
FIG. 28 is an explanatory diagram showing a condition of the pawl corresponding to FIG. 27.
Figure 29:
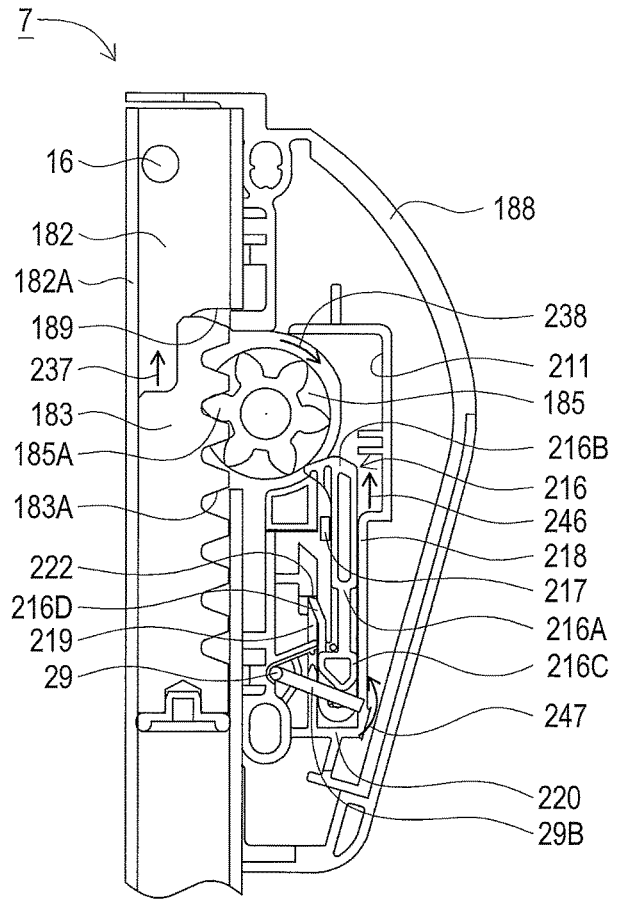
FIG. 29 is an explanatory diagram showing a condition wherein the pretensioner unit is further actuated and at the same time the moving member is pushed back and is elastically locked.
Figure 31:
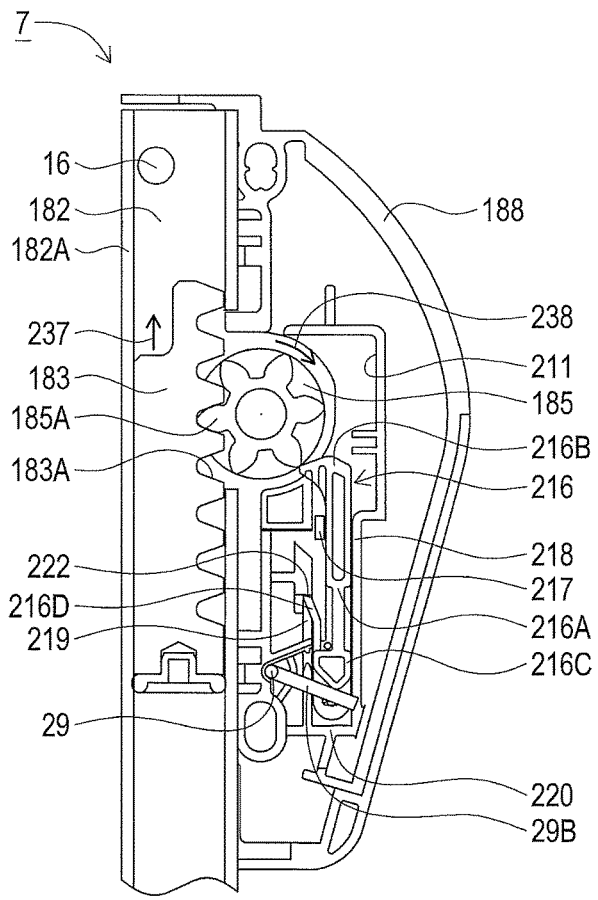
FIG. 31 is an explanatory diagram showing a condition wherein the pretensioner unit is further actuated and at the same time the moving member is elastically locked.

At this time, as shown in FIG. 28, as the pressing member 30 coupled with the bent portion 29A of the coupling member 29 has already caused the pawl 23 to rotate into a position of engagement with the ratchet gear teeth 35A, the linear portion 29C (shafted portion) of the coupling member 29 is further elastically twisted and deformed in a circumferential direction. Then, as shown in FIG. 29 and FIG. 31, once the positioning portion 216F comes in contact with the stop rib 220 to stop downward movement of the moving member 216, the arm portion 29B is rotated in an upward direction (corresponding to the direction of arrow 247) by an elastic restoring force generated by twisting and deformation of the linear portion 29C (shafted portion) of the coupling member 29 in a circumferential direction. As a result, the moving member 216 is guided by the respective guiding ribs 217 through 219 until a front end portion of its engagement piece 216D comes in contact with and engages the engagement portion 222 formed in the guiding rib 219 and is linearly moved in an upward direction (corresponding to the arrow 246) by the arm portion 29B via the contact portion 216C.

Figure 32:
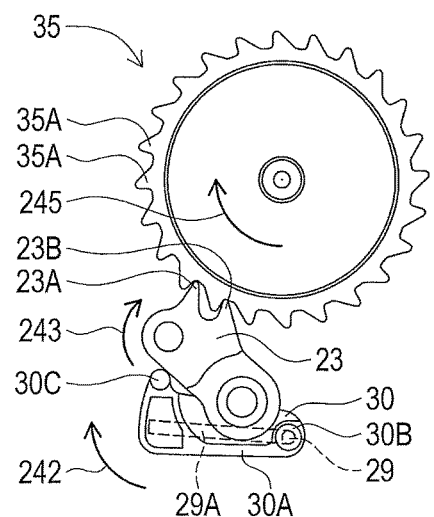
FIG. 32 is an explanatory diagram showing a condition wherein the pawl corresponding to FIG. 31 is engaged with the ratchet gear.

As shown in FIG. 29 and FIG. 31, the front end portion of the engagement piece 216D of the moving member 216 travels upwards (corresponding to arrow 246) and comes in contact to engage the engagement portion 222 formed in the guiding rib 219. Also, the engagement piece 216D and the engagement portion 222 act as position regulating means for regulating upward movement of the moving member 216. In this condition, the arm portion 29B which comes in contact with the bottom face of the contact portion 216C is rotated downwards by a predetermined amount from the rotating position wherein the pressing member 30 in FIG. 23 causes the pawl 23 to engage the ratchet gear teeth 35A. Thus, as shown in FIG. 32, the respective engagement teeth 23A and 23B of the pawl 23 are completely engaged with the ratchet gear teeth 35A. In this condition, the linear portion 29C (shafted portion) of the coupling member 29 is elastically twisted and deformed by a predetermined amount in a circumferential direction to rotate and urge the pressing member 30 towards the pawl 23 side (corresponding to the arrow 242). As a result, the pawl 23 is held while being engaged with the ratchet gear teeth 35A.

The front end portion of the engagement piece 216D of the moving member 216 travels upwards (corresponding to the direction of arrow 246) and comes in contact to engage with the engagement portion 222 formed in the guiding rib 219. When the moving member 216 restricts further movement thereof in an upward direction, the projection portion 216B of the moving member 216 is positioned at an outer side in a radial direction with respect to the addendum circle of the pinion gear teeth 185A. Also, the piston 183 moves towards a tip end side of the piston guiding portion 182A under the pressure of the generated gas (corresponding to the direction of the arrow 237) and the pinion gear 185 having the pinion gear teeth 185A engaged with the rack 183A rotates smoothly (corresponding to the direction of arrow 238).

Figure 30:
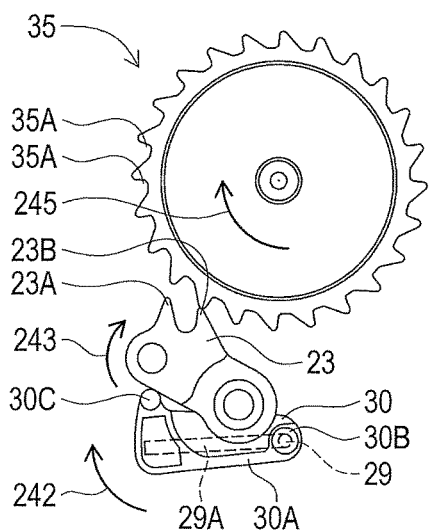
FIG. 30 is an explanatory diagram showing a condition wherein the pawl corresponding to FIG. 29 is removed from the ratchet gear.

Accordingly, as shown in FIG. 30 and FIG. 32, the take-up drum 65 and the ratchet gear 35 are driven to rotate integrally in a webbing-take-up direction (corresponding to the direction of arrow 245) via the pinion gear 185, the pawl base 201, the respective clutch pawls 202 and the internal gear 69, and the webbing 3 is wound onto the take-up drum 65.

Upward movement of the moving member 216 is restricted and stopped (corresponding to the direction of arrow 246) as the front end portion of the engagement piece 216D thereof comes in contact with and engages the engagement portion 222. Thus, as shown in FIG. 30, when the respective engagement teeth 23A and 23B of the pawl 23 pass over the ratchet gear teeth 35A rotating in a webbing-take-up direction (direction of arrow 245), the pressing member 30 is rotated by the pawl 23 in a direction away from the ratchet gear 35 to further elastically twist and deform the linear portion 29C (shafted portion) of the coupling member 29.

Accordingly, the pressing member 30 coupled to the bent portion 29A of the coupling member 29 is urged and rotated towards the ratchet gear 35 side (corresponding to arrow 242) with the boss 30B at the center. As a result, once the respective engagement teeth 23A and 23B of the pawl 23 pass over the ratchet gear teeth 35A, the pressing member 30 causes the pawl 23 to rotate towards the ratchet gear 35 side (corresponding to the direction of arrow 243) via the boss 30C and the respective engagement teeth 23A and 23B to engage again with the ratchet gear teeth 35A.

Figure 33:
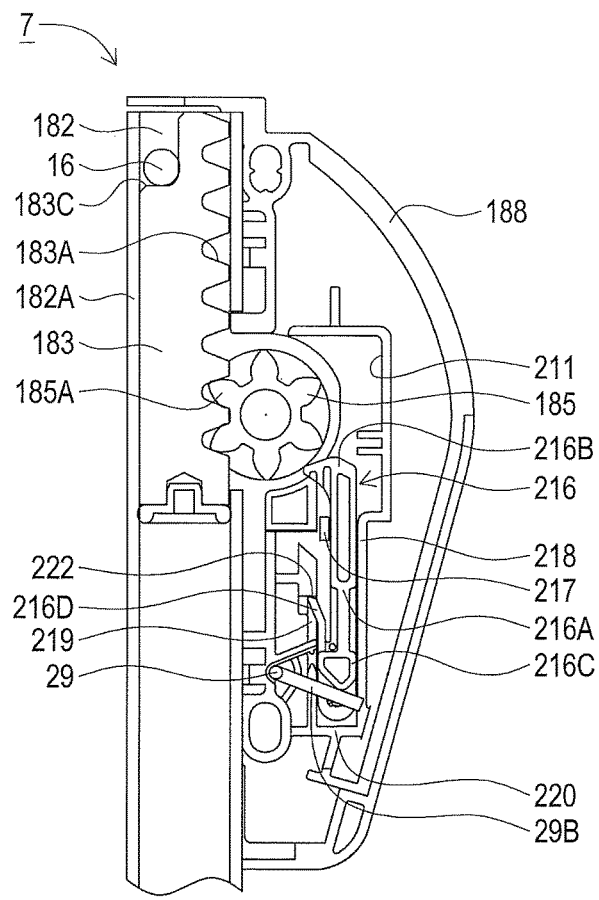
FIG. 33 is an explanatory diagram showing a condition wherein a piston of the pretensioner unit comes in contact with a stopper pin.

Thereafter, as shown in FIG. 33, in the piston 183, as the stepped portion 183C formed in the back face of the front end portion of rack 183A comes in contact with the stopper pin 16, and stops upward movement thereof, rotation of the take-up drum 65 and ratchet gear 35 is stopped, which ends take-up of the webbing 3. In other words, operation of the pretensioner unit 7 is ended.

Figure 34:
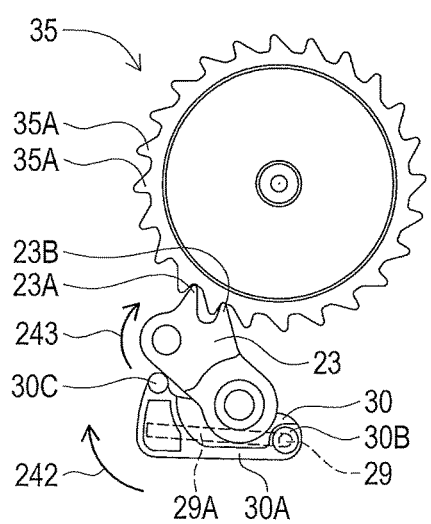
FIG. 34 is an explanatory diagram showing a condition wherein the pawl corresponding to FIG. 33 is engaged with the ratchet gear.

As shown in FIG. 34, similar with the condition shown in FIG. 32, the linear portion 29C (coupling portion) of the coupling member 29 is elastically twisted and deformed in a circumferential direction by a predetermined amount and the pressing member 30 is rotated and urged towards the ratchet gear 35 side (corresponding to the arrow 242) via the linear portion 29C and bent portion 29A of the coupling member 29, with the boss 30B at the center. Thus, the pressing member 30 causes the pawl 23 to rotate towards the ratchet gear 35 side (corresponding to the direction of arrow 243) via the boss 30C, which maintains engagement between the respective engagement teeth 23A and 23B of the pawl 23 and the ratchet gear teeth 35A.

[Energy Absorption]

Next, as the pawl 23 is held in a state allowing engagement with the ratchet gear teeth 35A following operation of the pretensioner unit 7 in case of vehicle collision or the like, in case the passengers move relatively forward with respect to the vehicle, applying a load onto the webbing 3, the pawl 23 immediately engages and binds with the ratchet gear teeth 35A to restrain the passengers, thus applying a pull-out load to the webbing 3. Then, if the pull-out load applied to the webbing 3 exceeds a predetermined value set in advance, since rotation of the ratchet gear 35 is hindered by the pawl 23, twisting and deformation of the shafted portion 66C of the torsion bar 66 starts under the running torque which is applied to the take-up drum 65 in a webbing-pull-out direction. The take-up drum 65 is rotated in the webbing-pull-out direction due to the torsional deformation at the shaft portion 66C of the torsion bar 66, whereby impact energy is absorbed in the form of the torsional deformation caused to the torsion bar 66, as "first energy absorption mechanism".

Incidentally, since the pawl 23 and the ratchet gear 35 are in an engaged state when the take-up drum 65 is rotated, relative rotation is caused between the ratchet gear 35 and the take-up drum 65. Consequently, relative rotation is subsequently caused between the wire 67 and the ratchet gear 35 due to rotation of the take-up drum 65. Thereby, the wire 67 of which crooked portion 67A held in the holding-side crooked path 77 of the take-up drum 65 is guided and pulled out accompanying plastic deformation through a deformation-giving crooked path defined by inner periphery of the flange portion 85 of the ratchet gear 35 and outer periphery portion of the convex portion 84. Thereby impact energy is absorbed in the form of pull-out resistance of the wire 67, as "second energy absorption mechanism".

In one embodiment, a pretensioner mechanism comprises the gas generating member 181, the pipe cylinder 182, the piston 183, the sealing plate 191, the pinion gear 185, the clutch mechanism 186, and the holding plate 187. In one embodiment, a locking mechanism comprises the pressing member 30, the connecting member 29, the cover member 188, and the moving member 216. In one embodiment, a position restricting device comprises the engagement piece 216D and the engagement portion 222. In one embodiment, a rotating device comprises the engagement piece 216D, the engagement portion 222, and the moving member 216. The pinion gear 185 is used as an example of a driven body. The pinion gear teeth 185A is used as an example of an interlocking portion. In one embodiment, a driving device comprises the gas generating member 181, the pipe cylinder 182, the piston 183 and the sealing plate 191.

As already described in detail, in the seatbelt retractor 1 according to the present embodiment, the moving member 216 is fitted in the guide portion 221 and at the same time the positioning pin 223 is fitted in the positioning hole 216E at an inner side of the cover member 188 and held therein. Also, the bottom end portion of the contact portion 216C of the moving member 216 is positioned either to come in contact with the front end portion of the arm portion 29B of the coupling member 29 or in the vicinity of the front end portion of the arm portion 29B.

When the pretensioner unit 7 is actuated, the moving member 216 is pressed by the pinion gear teeth 185A of the pinion gear 185 to travel downwards and causes the arm portion 29B of the coupling member 29 to rotate downwards. As a result, when the arm portion 29B is rotated downwards, the pressing member 30 is rotated towards the side of the ratchet gear 35 which rotates in a webbing-take-up direction via the linear portion 29C and the bent portion 29A of the coupling member 29 which can be elastically twisted and deformed in the direction of rotation. As a result, the pawl 23 which is pressed by the pressing member 30 engages the ratchet gear teeth 35A of the ratchet gear 35.

The engagement piece 216D of the moving member 216 is locked by the engagement portion 222 and rotation of the moving member 216 in a reverse direction is restricted in a state wherein the arm portion 29B of the coupling member 29 is rotated downwards by a predetermined amount which is equal to or exceeds a rotation amount required for the pawl 23 to engage the ratchet gear 35. Thus, when the engagement piece 216D of the moving member 216 is engaged with the engagement portion 222, the linear portion 29C (shafted portion) of the coupling member 29 is elastically twisted and deformed in a circumferential direction, to rotate and urge the pressing member 30 towards the pawl 23 side. As a result, as the pawl 23 is rotated and urged towards the ratchet gear 35 side by the pressing member 30, the pawl 23 is held while being securely engaged with the ratchet gear 35 which allows for the pawl 23 to be held more securely while being engaged with the ratchet gear 35.

Once the respective engagement teeth 23A and 23B of the pawl 23 which is pressed by pressing member 30 passes over the ratchet gear teeth 35A which rotate in a webbing-take-up direction, the pressing member 30 is rotated by the pawl 23 in a direction away from the ratchet gear 35 and the linear portion 29C (shafted portion) of the coupling member 29 is further elastically twisted and deformed via the bent portion 29A. As a result, the pawl 23 is held in a state wherein it is rotated and urged by the pressing member 30 towards an engaging direction with the ratchet gear 35 side.

Thus, take-up of the webbing 3 is smoothly carried out by operation of the pretensioner unit 7, and once operation of the pretensioner unit 7 ends, the pawl 23 immediately engages the ratchet gear 35 to prevent hindering of the rotation of the take-up drum 65 in the webbing 3 pull-out direction. Accordingly, similar with conventional art, there is no need to hold the urging member in a state wherein an urging force can be generated in normal state and therefore the strength requirements required for the cover member 188 to hold the moving member 216 can be dropped. This makes it possible to achieve a compact and lightweight the cover member 188 and the moving member 216 which in turn makes it possible to achieve a more compact and lightweight seatbelt retractor 1 than in conventional art.

The moving member 216 which moves when the pretensioner unit 7 is actuated and the arm portion 29B of the coupling member 29 which is pressed by the moving member 216 in a moving state to rotate in a predetermined direction are held inside the cover member 188 so that the arm portion 29B is positioned to either come in contact with or in the vicinity of the bottom end portion of the contact portion 216C of the moving member 216. When the engagement piece 216D of the moving member 216 which has moved engages the engagement portion 222 of the cover member 188, the position of the moving member 216 is restricted by a position restricting means so as to prevent movement thereof in a reverse direction. Thus, it is possible to achieve a rotating device with a simple configuration, wherein with a simple configuration the device causes the arm portion 29B to rotate and at the same time restricts rotation of the arm portion 29B in a reverse direction from its rotating state. As a result, the parts count required for the seatbelt retractor 1 can be decreased as compared to conventional art.

In the operation of the pretensioner unit 7, the projecting portion 216B of the moving member 216 is pressed by the pinion gear teeth 185A to move downwards in response to rotation of the pinion gear 185. As a result, the moving member 216 causes the arm portion 29B to rotate downwards and when the pretensioner unit 7 is actuated, it makes it possible to hold the pawl 23 in a state of secure engagement with the ratchet gear 35 via the coupling member 29 and the pressing member 30.

Furthermore, the coupling member 29 is made of a linear member such as steel material or the like and opposite ends thereof are bent at a substantially right angle to face each other at approximately 180 degrees, allowing formation of the bent portion 29A and the arm portion 29B, which makes it possible to achieve a device with an even simpler configuration.

The present invention is not limited to the above-described embodiment, but various improvements and modifications can be made thereto without departing from the spirit of the present invention.

What is claimed is:

1. A seatbelt retractor comprising:
    a housing having a first side wall portion and a second side wall portion facing each other;
    a take-up drum supported rotatably by and between the first side wall portion and the second side wall portion, and adapted to take up a webbing thereon;
    a ratchet gear provided at one end of the take-up drum;
    a pawl rotatably supported at the first side wall portion and which does not engage with the ratchet gear in normal state but engages therewith in response to a predetermined acceleration of a vehicle or a predetermined pull-out acceleration of the webbing to prevent rotation of the take-up drum in a pull-out direction of the webbing;
    a pretensioner mechanism mounted on the second side wall portion and actuated in case of vehicle collision to cause the take-up drum to rotate in a take-up direction of the webbing; and
    a locking mechanism adapted to hold the pawl in a state of engaging with the ratchet gear by actuation of the pretensioner mechanism,
    wherein the locking mechanism comprises:
        a coupling member comprising an arm portion which is rotatably supported by the housing and adapted to rotate in a predetermined direction in response to the actuation of the pretensioner mechanism, a pressing portion adapted to press the pawl towards an engagement direction with the ratchet gear in response to rotation of the arm portion, and a coupling portion adapted to couple the arm portion and the pressing portion; and
        a rotating device adapted to rotate the arm portion in the predetermined direction in response to the actuation of the pretensioner mechanism and hold the arm portion to restrict a reverse rotation thereof, and wherein in the actuation of the pretensioner mechanism, when the pawl, pressed by the pressing portion and in contact with the ratchet gear rotating in the take-up direction, passes over each of teeth of the ratchet gear, the coupling member is elastically twisted and deformed between the arm portion and the pressing portion to hold the pawl in a state of being urged toward the engagement direction with the ratchet gear.

2. The seatbelt retractor according to claim 1, wherein in a state where the rotating device rotates the arm portion by an amount equal to or exceeding a rotation amount required for the pawl to engage the ratchet gear and hold the arm portion to restrict a reverse rotation thereof, the coupling member is elastically twisted and deformed between the arm portion and the pressing portion to hold the pawl being engaged with the ratchet gear.

3. The seatbelt retractor according to claim 1, wherein the rotating device comprises:
   a moving member adapted to move upon actuation of the pretensioner mechanism to press the arm portion so as to rotate the arm portion in the predetermined direction; and
   a position restricting device adapted to restrict positioning of the moving member to hold the arm portion towards the predetermined direction.

4. The seatbelt retractor according to claim 3, wherein the pretensioner mechanism comprises:
   a driven body adapted to rotate coaxially with a rotational axis of the take-up drum in case of vehicle collision; and
   a driving device adapted to drive the driven body to rotate in the take-up direction of the webbing;
   wherein the driven body has an interlocking portion capable of pressing the moving member;
   wherein, when the driven body is driven to rotate by the driving device, the interlocking portion of the driven body press the moving member to move, to rotate the arm portion in the predetermined direction.

5. The seatbelt retractor according to claim 1, wherein
the coupling member is made of a linear member, and
the arm portion is formed with one end of the coupling member being bent by a predetermined length.

* * * * *